US011065771B2

(12) United States Patent
Shintake et al.

(10) Patent No.: US 11,065,771 B2
(45) Date of Patent: Jul. 20, 2021

(54) ELECTROADHESIVE DEVICE, SYSTEM AND METHOD FOR GRIPPING

(71) Applicant: ECOLE POLYTECHNIQAUE FEDERALE DE LAUSANNE (EPFL), Lausanne (CH)

(72) Inventors: Jun Shintake, Neuchatel (CH); Samuel Rosset, Chaumont (CH); Bryan Schubert, San Jose, CA (US); Dario Floreano, St-Prex (CH); Herbert Shea, Cormondreche (CH)

(73) Assignee: ECOLE POLYTECHNIQUE FÉDÉRALE DE LAUSANNE (EPFL), Lausanne (CH)

(*) Notice: Subject to any disclaimer, the term of this patent is extended or adjusted under 35 U.S.C. 154(b) by 288 days.

(21) Appl. No.: 16/079,514

(22) PCT Filed: Feb. 24, 2017

(86) PCT No.: PCT/IB2017/051068
§ 371 (c)(1),
(2) Date: Aug. 23, 2018

(87) PCT Pub. No.: WO2017/145103
PCT Pub. Date: Aug. 31, 2017

(65) Prior Publication Data
US 2019/0047157 A1 Feb. 14, 2019

Related U.S. Application Data

(60) Provisional application No. 62/299,266, filed on Feb. 24, 2016.

(51) Int. Cl.
B25J 15/00 (2006.01)
H02N 13/00 (2006.01)

(52) U.S. Cl.
CPC .......... B25J 15/0085 (2013.01); H02N 13/00 (2013.01)

(58) Field of Classification Search
CPC ....... H02N 13/00; B25J 15/0085; B25J 15/00; H01L 27/6833; H01L 41/193; H01L 41/1132; H01L 41/27
See application file for complete search history.

(56) References Cited

U.S. PATENT DOCUMENTS 6,664,718 B2 * 12/2003 Pelrine .................... F04B 35/00
310/330
6,768,246 B2 * 7/2004 Pelrine .................... F02G 1/043
310/317

(Continued)

FOREIGN PATENT DOCUMENTS

WO 2004/079832 9/2004
WO 2004/095536 A2 11/2004

(Continued)

OTHER PUBLICATIONS

International Search Report for PCT/IB2017/051068 dated Jun. 23, 2017, 4 pages.

(Continued)

Primary Examiner — Yusef A Ahmed
(74) Attorney, Agent, or Firm — Nixon & Vanderhye P.C.

(57) ABSTRACT

A device for electroadhesion and conversion of electrical energy into mechanical energy, for example electrostatic actuation, is provided, including a soft polymeric dielectric support having at least two sets of overlapping electrodes patterned respectively on the upper surface and bottom surface of the polymeric support, the electrodes of the two sets can be electrically activated through a power supply for providing voltage change suitable for electroadhesion, electrostatic actuation or both at the same time.

30 Claims, 20 Drawing Sheets

(56) References Cited

U.S. PATENT DOCUMENTS

| | | | | |
|---|---|---|---|---|
| 6,876,135 | B2* | 4/2005 | Pelrine | A43B 3/0005 310/317 |
| 8,665,578 | B2* | 3/2014 | Pelrine | H02N 13/00 361/234 |
| 9,195,058 | B2* | 11/2015 | Zarrabi | G02F 1/29 |
| 2001/0036790 | A1* | 11/2001 | Kornbluh | A63H 13/00 446/337 |
| 2002/0130673 | A1* | 9/2002 | Pelrine | H01L 41/1132 324/727 |
| 2002/0175594 | A1* | 11/2002 | Kornbluh | B60G 17/01941 310/317 |
| 2002/0175598 | A1* | 11/2002 | Heim | H01L 41/0986 310/328 |
| 2003/0006669 | A1* | 1/2003 | Pei | H02N 11/006 310/309 |
| 2004/0217671 | A1* | 11/2004 | Rosenthal | H01L 41/0986 310/328 |
| 2009/0184606 | A1* | 7/2009 | Rosenthal | H01L 41/0836 310/367 |
| 2010/0026143 | A1* | 2/2010 | Pelrine | A63H 3/365 310/366 |
| 2010/0171393 | A1* | 7/2010 | Pei | G06F 3/016 310/330 |
| 2011/0025170 | A1* | 2/2011 | Rosenthal | H01L 41/27 310/328 |
| 2011/0193362 | A1* | 8/2011 | Prahlad | B25J 15/0085 294/81.2 |
| 2013/0010398 | A1* | 1/2013 | Prahlad | H02N 13/00 361/234 |
| 2013/0186699 | A1* | 7/2013 | Prahlad | B62D 57/024 180/55 |
| 2013/0242455 | A1* | 9/2013 | Prahlad | B25J 15/00 361/234 |
| 2013/0294875 | A1* | 11/2013 | Prahlad | B65G 17/46 414/730 |
| 2014/0036404 | A1* | 2/2014 | Prahlad | H02N 13/00 361/234 |
| 2014/0104744 | A1* | 4/2014 | Prahlad | H02N 13/00 361/234 |
| 2014/0133062 | A1* | 5/2014 | Prahlad | H02N 13/00 361/234 |
| 2019/0030732 | A1* | 1/2019 | Kondoh | B25J 13/082 |
| 2019/0047696 | A1* | 2/2019 | Gwin | B25J 9/1085 |

FOREIGN PATENT DOCUMENTS

| | | |
|---|---|---|
| WO | 2008/070201 A2 | 6/2008 |
| WO | 2011/100028 A1 | 8/2011 |
| WO | 2012/096982 A1 | 7/2012 |
| WO | 2012/129541 A2 | 9/2012 |
| WO | 2013/166324 A2 | 11/2013 |
| WO | 2013/188420 A1 | 12/2013 |
| WO | 2014/059304 A1 | 4/2014 |
| WO | 2014/059325 A1 | 4/2014 |

OTHER PUBLICATIONS

Written Opinion of the ISA for PCT/IB2017/051068 dated Jun. 23, 2017, 6 pages.

Bicchi, Antonio, "Hands for Dexterous Manipulation and Robust Grasping: A Difficult Road Toward Simplicity," IEEE Transactions on Robotics and Automation, vol. 16, No. 6, Dec. 2000, pp. 652-662.

Brown, Eric, et al., "Universal robotic gripper based on the jamming of granular material," PNAS, vol. 107, No. 44, Nov. 2, 2010, pp. 18809-18814, and Supporting Information, 3 pages.

Carbone, Giuseppe, "Grasping in Robotics," Chapter 2—Stiffness Analysis for Grasping Tasks, Springer Verlag, 2013, pp. 17-55.

Cretu, Ana-Maria, et al., "Soft Object Deformation Monitoring and Learning for Model-Based Robotic Hand Manipulation," IEEE Transactions on Systems, Man, and Cybernetics-Part B: Cybernetics, vol. 42, No. 3, Jun. 2012, pp. 740-753.

Hirai, Shinichi, et al., "Robust Grasping Manipulation of Deformable Objects," Proceedings of the 4th IEEE International Symposium on Assembly and Task Panning, May 2001, pp. 411-416.

Kenaley, Gary L., et al., "Electrorheological Fluid-Based Robotic Fingers with Tactile Sensing," IEEE International Conference on Robotics and Automation, vol. 1, May 1989, pp. 132-136.

Lin, Huan, et al., "Picking up a soft 3D object by "feeling" the grip," The International Journal of Robotics Research, vol. 34, No. 11, 2015, pp. 1361-1384.

Monkman, G. J., "Compliant robotic devices, and electroadhesion," Robotica, vol. 10, Issue 2, 1992, pp. 183-185.

Monkman, G. J., et al., "Memory Foams for Robot Grippers," IEEE 5th International Conference on Advanced Robotics, vol. 1, 1991, pp. 339-342.

Rosset, Samuel, et al., "Flexible and stretchable electrodes for dielectric elastomer actuators," Applied Physics A, vol. 110, Issue 2, Feb. 2013, pp. 281-307.

\* cited by examiner

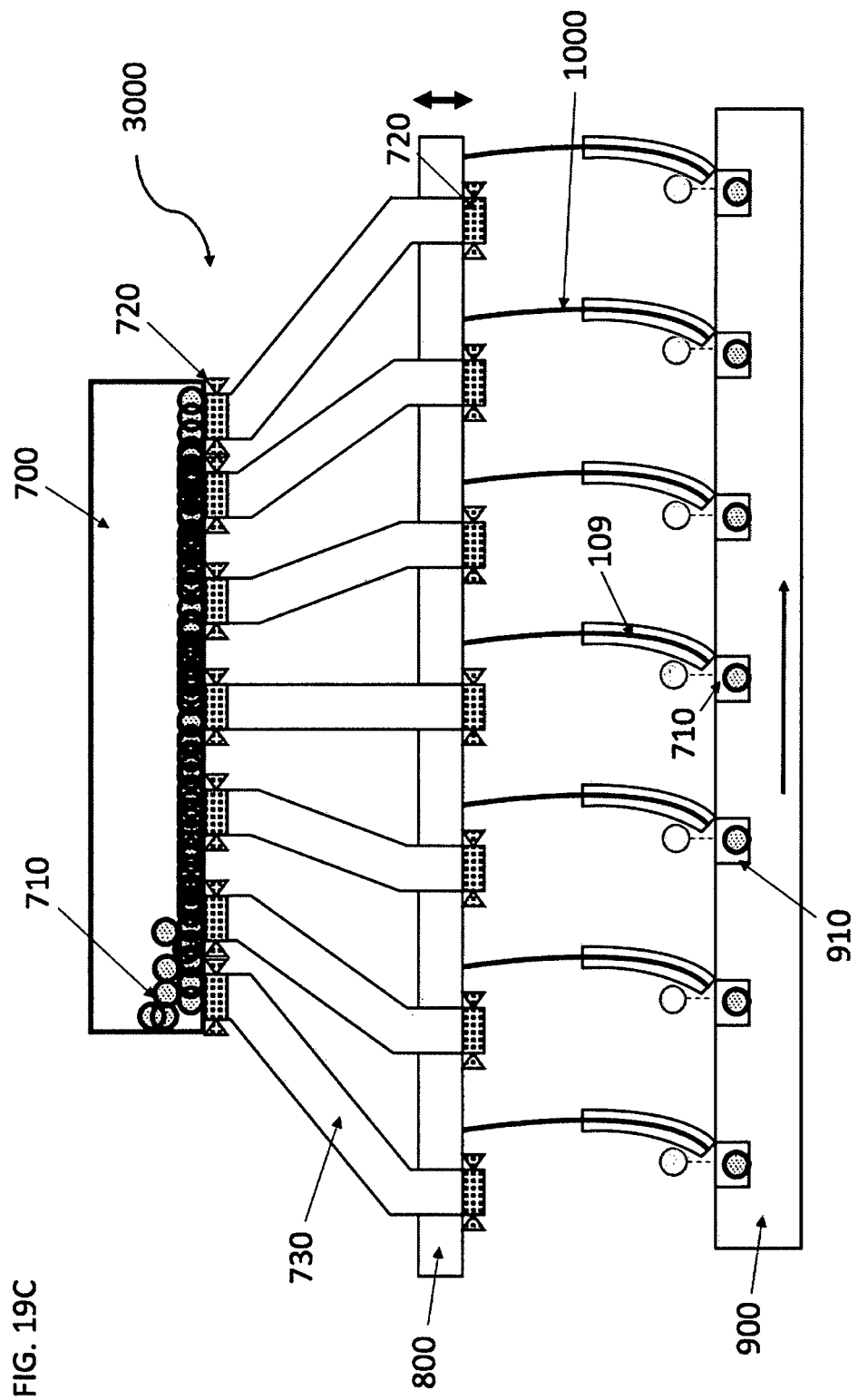

ELECTROADHESIVE DEVICE, SYSTEM AND METHOD FOR GRIPPING

This application is the U.S. national phase of International Application No. PCT/IB2017/051068 filed Feb. 24, 2017 which designated the U.S. and claims benefit of U.S. Provisional Application No. 62/299,266 filed Feb. 24, 2016, the entire contents of each of which are hereby incorporated by reference.

FIELD OF THE INVENTION

The present invention relates to a device, system, and method for providing electrostatic adhesion and at the same time conversion between electrical and mechanical energy, for example in the field of picking, gripping and robotics.

BACKGROUND ART

A child easily picks up with his hand objects of an enormous variety of shapes, even if they are fragile or highly deformable. In the world of robotics, in order to mimic this dexterity, fingered robotic grippers often use many actuators in combination with feedback control based on visual, tactile, force, and angular position sensing, followed by trajectory planning. See A. Bicchi, "Hands for dexterous manipulation and robust grasping: a difficult road toward simplicity," IEEE Transactions on Robotics and Automation, Vol. 16, Iss. 6, pp. 652-662, 2000. See also G. Carbone, "Grasping in Robotics," Springer Verlag, London, UK, 2013.

If the target object is fragile, such as a chicken egg for example, the human hand adapts the grasping force, exploiting the compliance of tissue in the fingers and sensing the shear movement to safely grip the object. Moreover, in the case of deformable objects, such as a water balloon, human hands can sense the stiffness and follow the deformation while continuously regulating force and finger position. Replicating these grasping properties with traditional robotic grippers typically require complex sensing, motor accuracy, modelling, and learning. See S. Hirai et al., "Robust grasping manipulation of deformable objects," IEEE International Symposium on Assembly and Task Planning, Fukuoka, Japan, pp. 411-416, May 2001. See also A.-M. Cretu et al, "Soft Object Deformation Monitoring and Learning for Model-Based Robotic Hand Manipulation," IEEE Trans. Systems, Man and Cybernetics—Part B, Vol. 42, No. 3, pp. 740-753, 2012, and H. Lin et al., "Picking up a soft 3D object by 'feeling' the grip," International Journal of Robotics Research, Vol. 34, No. 11, pp. 1361-1384, 2015.

Endowing robotic grippers made with rigid components with the versatility to grasp objects with many different shapes and differing material properties can be computationally challenging, costly and slow, and require external sensors. For this reason, robotic grippers typically have a specialized design for a specific object type. Soft robotics, especially when combined with artificial skins for distributed pressure and force sensing, offer a path toward structures where the intrinsic compliance of elastomers allows for handling complex objects with simpler control based on passive adaptation.

Early investigation on shape-adaptable grippers exploited a variety of technologies such as granule-filled bag from which air is evacuated, now known as granular jamming. See E. Brown et al., "Universal robotic gripper based on the jamming of granular material," Proceedings of the National Academy of Sciences of the USA, Vol. 107, No. 44, pp. 18809-18814, 2010. Also the use of electrorheological (ER) fluids have been investigated. See G. L. Kenaley et al., "Electrorheological fluid-based robotic fingers with tactile sensing," IEEE International Conference on Robotics and Automation, Vol. 1, pp. 132-136, Arizona, USA, May 1989. In addition, ER fluid used in combination with electroadhesion have been researched. See G. J. Monkman, "Compliant robotic devices, and electroadhesion," Robotica, Vol. 10, Iss. 2, pp. 183-185, 1992. Moreover, the use of pneumatic actuators and shape-memory foams has also been tested. See G. J. Monkman et al., "Memory foams for robot grippers," 5th International Conference on Advanced Robotics, Vol. 1, pp. 339-342, 1991. Yet even for current soft robots, many tasks that are easy for human hands, such as handling flat objects and deformable objects, remain a major challenge.

Conventional robotic grippers typically use either suction or a combination of large normal forces and fine control with mechanical actuation in order to grip objects. Such techniques have several drawbacks. For example, the use of suction tends to require smooth, clean, dry and generally flat surfaces, which limits the types and conditions of objects that can be gripped. Suction also tends to require a lot of power for the pumps and is prone to leaks at any location on a vacuum or low pressure seal, with a resulting loss of suction being potentially catastrophic. The use of mechanical actuation often requires large normal or "crushing" forces against an object, and also tends to limit the ability to robotically grip fragile or delicate objects. Producing large forces also increases the cost of mechanical actuation. Mechanical pumps and conventional mechanical actuation with large crushing forces also often require substantial weight, which is a major disadvantage for some applications, such as the end of a robot arm where added mass must be supported. Furthermore, even when used with sturdy objects, robotic arms, mechanical claws and the like can still leave damaging marks on the surface of the object itself.

In some background art research, electroadhesion has been studied for gripping purposes. Electroadhesion can have many advantages over comparable adhesion technologies, such as vacuum or gecko-inspired adhesion. Vacuum handling technologies are widely used in industry, but are limited to objects with smooth, nonporous surfaces. Additionally, the need for vacuum pump and tubing adds significant bulk. Gecko-inspired adhesion uses van der Waals forces between passively deformed microfibers and the target surface. However, in this technology, the adhesion mechanism relies upon external mechanical preloading in the normal or shear direction, which may cause unpredictable deformation and possible damage when the target object is deformable or fragile. Reversibility of the gecko adhesion is also challenging to achieve with lightweight objects, and the adhesion mechanism does not work or works poorly on low surface-energy materials, such as Teflon.

Concerning electroadhesion, many attempts have been done in the past to create suitable devices for different applications. Electroadhesion has been used in wafer handling, wall climbing robots, and rigid and flexible grippers. For instance, International Patent Application with publication no. WO 2008/070201 describes electroadhesion technology that permits controllable adherence between two objects. Generally speaking, the disclosure teaches an electroadhesive device comprising a deformable surface, a first electrode, a second electrode, and an insulation material.

International Patent Application with Publication No. WO 2011/100028 describes an implementation of an electroadhesive gripping device. Electroadhesive gripping surfaces can be arranged onto a plurality of continuous fingers, and various gripping surfaces on each finger can be coupled together and manipulated with respect to each other by an actuating component, such as a cable actuator. Other applications for the electrostatic adhesion effect can be found in International Patent Applications having the Publication Nos. WO 2012/096982, WO 2012/129541, WO 2013/166324, WO 2013/188420, WO 2014/059304 and WO 2014/059325.

However, notwithstanding the advancements in the field of electroadhesion and their uses as described above, the background art fails to provide practical solutions that can be used in the field of robotics and automated object handling. Because of these deficiencies of the background art devices, systems, and methods related to electroadhesion, substantial improvements over the background art are desired and necessary.

SUMMARY

In view of the above, according to one aspect of the present invention, a device is disclosed that can provide electrostatic actuation with intrinsic electroadhesion force. The device implements a novel electrode and voltage configuration which enables manipulation of objects such as deformable, fragile objects of any shape with a single control signal, and even flat objects like paper.

Accordingly, according to one aspect of the present invention, a device is provided for converting between electrical energy and mechanical energy and for providing electrostatic adhesion. The device preferably includes (a) a soft dielectric polymeric support having an upper surface and a lower surface, (b) a first set of at least two adjacent electrodes operatively disposed in/on the upper surface of a first active area of the polymeric support, and (c) a second set of at least two adjacent electrodes operatively disposed in/on the bottom surface of a first active area of the polymeric support. Moreover, preferably the first set of electrodes and the second set of electrodes are overlapped along an axis.

In one embodiment, the device preferably further comprises a first deformable insulating layer operatively connected on the first active area and a second deformable insulating layer operatively connected below the first active area. Moreover, preferably, in one embodiment, the electrodes in each set are parallel among them. In addition, in another embodiment, the electrodes in each set are preferably evenly disposed. Furthermore, in one embodiment, preferably the electrodes are compliant.

In one embodiment, the device further includes a circuitry configured to provide a voltage between adjacent electrodes of each set of electrodes and/or between overlapped electrodes in different sets of electrodes upon connection with a power supply.

In one embodiment, the conversion between electrical and mechanical energy is provided by applying a voltage creating opposed charges in each overlapped electrode of different sets of electrodes and equal charges in adjacent electrodes of each set of electrodes. In one embodiment, the polymeric support is arranged in a manner which causes at least the first active area to deflect in response to a suitable applied voltage.

In one embodiment, the polymeric support is elastically pre-strained on at least the first active area.

In one embodiment, the electrostatic adhesion is provided by applying a voltage creating alternating unlike charges in adjacent electrodes of each set of electrodes and equal charges in each overlapped electrode of different set of electrodes.

In one embodiment, the conversion between electrical and mechanical energy is provided concurrently with the electrostatic adhesion by applying a voltage creating alternating unlike charges in adjacent electrodes of each set of electrodes, and opposed charges in each overlapped electrode of different sets of electrodes.

According to one embodiment of the present invention, the device preferably includes a plurality of active areas, each active area having (a) a first set of at least two adjacent electrodes operatively disposed in/on the upper surface of the polymeric support, and (b) a second set of at least two adjacent electrodes operatively disposed in/on the bottom surface of the polymeric support. In addition, preferably the first set of electrodes and the second set of electrodes in each active area are overlapped along an axis.

In one embodiment, the above device further comprises, in each active area, a first deformable insulating layer operatively connected on the upper surface and a second deformable insulating layer operatively connected to the bottom surface.

In one embodiment, the electrodes in each set are parallel among them. In one embodiment, the electrodes in each set are evenly disposed. In one embodiment, the electrodes are compliant.

In one embodiment, the device further comprises a circuitry configured to provide a voltage between adjacent electrodes of each set of electrodes and/or between overlapped electrodes in different sets of electrodes upon connection with a power supply.

In one embodiment, the conversion between electrical and mechanical energy is provided in each active area by applying a voltage creating opposed charges in each overlapped electrode of different sets of electrodes and equal charges in adjacent electrodes of each set of electrodes.

In one embodiment, the polymeric support is arranged in a manner which causes at least one active area of the plurality of active areas to deflect in response to a suitable applied voltage.

In one embodiment, the polymeric support is elastically pre-strained on at least one active area of the plurality of active areas.

In one embodiment, the electrostatic adhesion is provided by applying a voltage in at least one active area of the plurality of active areas by creating alternating unlike charges in adjacent electrodes of each set of electrodes and equal charges in each overlapped electrode of different set of electrodes.

In one embodiment, the conversion between electrical and mechanical energy is provided concurrently with the electrostatic adhesion by applying a voltage creating alternating unlike charges in adjacent electrodes of each set of electrodes, and opposed charges in each overlapped electrode of different sets of electrodes in at least one active area of the plurality of active areas.

In one embodiment, at least a first active area and at least a second active area are disposed on opposite sides of the polymeric support.

Still another aspect of the invention relates to a shear gripping system including (a) the device as previously described operatively connected to a movable load-bearing structure, and (b) a power supply configured to electrically connect to one or more electrodes. Preferably, upon application of a voltage to the one or more electrodes via the power supply, the device provides electrostatic adhesion possibly with conversion of electrical energy to mechanical energy, thereby causing adhesion to an object situated proximate to an active area and a shear force to be applied to the adhered object, via the load-bearing structure, wherein the shear force is sufficient to move the adhered object.

In one embodiment, the device of the system is configured to adhere to a sidewall of the object and to move the object in a direction substantially parallel to the sidewall via shear interaction between an active area of the device and the sidewall.

In one embodiment, the system comprises a plurality of devices as previously described operatively connected to a movable load-bearing structure.

In one embodiment, the active areas of the plurality of devices are configured to adhere to same, opposite or otherwise different sidewalls of the adhered object.

Another aspect of the invention relates to a shear gripping system having (a) a device as previously described comprising a first active area and a second active area, having the first active area and the second active area disposed on opposite sides of the polymeric support, operatively connected to a movable load-bearing structure disposed between the first and the second active areas; and (b) a power supply configured to electrically connect to one or more electrodes.

Moreover, preferably, upon application of a voltage to the one or more electrodes via the power supply, the device provides electrostatic adhesion possibly with conversion of electrical energy to mechanical energy, thereby causing adhesion to an object situated proximate to an active area and a shear force to be applied to the adhered object, via the load-bearing structure, wherein the shear force is sufficient to move the adhered object.

In one embodiment, the first and second active areas of the device are configured to adhere to opposite sidewalls of the adhered object.

According to still another aspect of the present invention, a method for shear gripping an object with a gripping device of a robot is provided. Preferably, the gripping device includes a soft dielectric polymeric support having an upper surface and a lower surface, a first set of adjacent electrodes operatively disposed on the upper surface of a first active area of the polymeric support, and a second set of adjacent electrodes operatively disposed on the lower surface of a first active area of the polymeric support, the first set of electrodes and the second set of electrodes are overlapped along an axis. In addition, preferably, the method includes the steps of mechanically deflecting at least one of the first active area and the second active area by applying a first voltage to at least one of the first set and the second set of electrodes, to provide a mechanical movement, and providing electrostatic adhesion to the object with the at least one of the first active area and the second active area by applying a second voltage to at least one of the first set and the second set of electrodes, the second voltage being different from the first voltage.

According to another aspect, a device is provided for both converting between electrical energy and mechanical energy and for providing electrostatic adhesion, and the the device is configured to deflect in a bidirectional fashion. The device includes a first and a second partial device as described above, each having (a) a soft dielectric polymeric support having an upper surface and a lower surface, (b) a first set of at least two adjacent electrodes operatively disposed in/on the upper surface of a first active area of the polymeric support, and (c) a second set of at least two adjacent electrodes operatively disposed in/on the bottom surface of a first active area of the polymeric support, wherein at least one deformable insulating layer is placed between said first and said second partial devices and operatively connects them.

Preferably, the first set of electrodes and the second set of electrodes in each partial device are overlapped along an axis. Preferably, all electrodes of both partial devices are overlapped along an axis.

In one embodiment, the device preferably further comprises a first deformable insulating layer operatively connected on the first active area of the first partial device and a second deformable insulating layer operatively connected below the first active area of the second partial device. Moreover, preferably, in one embodiment, the electrodes in each set of each partial device are parallel among them. Moreover, preferably, in one embodiment, all electrodes of both partial devices are parallel among them. In addition, in another embodiment, the electrodes in each set of each partial device are preferably evenly disposed. Moreover, preferably, in one embodiment all electrodes of both partial devices are preferably evenly disposed. Furthermore, in one embodiment, preferably the electrodes are compliant.

In one embodiment, the device further includes for each partial device a circuitry configured to provide a voltage between adjacent electrodes of each set of electrodes and/or between overlapped electrodes in different sets of electrodes upon connection with a power supply.

In one embodiment, the conversion between electrical and mechanical energy is provided in a bidirectional fashion by applying in the first partial device a first voltage creating opposed charges in each overlapped electrode of different sets of electrodes and equal charges in adjacent electrodes of each set of electrodes, followed by application in the second partial device of a second voltage creating opposed charges in each overlapped electrode of different sets of electrodes and equal charges in adjacent electrodes of each set of electrodes. In one embodiment, the first and the second voltage have the same amplitude. In one embodiment, the first and the second voltage are provided in a sinusoidal fashion.

In one embodiment, the polymeric support of each partial device is elastically pre-strained on at least the first active area thereof.

In one embodiment, the electrostatic adhesion is provided, for each partial device, by applying a voltage creating alternating unlike charges in adjacent electrodes of each set of electrodes and equal charges in each overlapped electrode of different set of electrodes.

In one embodiment, the conversion between electrical and mechanical energy is provided concurrently with the electrostatic adhesion, in each partial device, by applying a voltage creating alternating unlike charges in adjacent electrodes of each set of electrodes, and opposed charges in each overlapped electrode of different sets of electrodes.

Still a further aspect of the invention relates to a dispensing system, comprising at least a device for converting between electrical energy and mechanical energy and for providing electrostatic adhesion, wherein the device deflects in a bidirectional fashion.

Still a further aspect of the invention relates to a distribution system, comprising at least a device for converting between electrical energy and mechanical energy and for providing electrostatic adhesion, wherein said device deflects in a bidirectional fashion.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 19A-19C show a schematic side view of different stages of a system 3000 that uses the bidirectional gripping device 1000 for dispensing objects 710 into different chambers 910.

Herein, identical reference numerals are used, where possible, to designate identical elements that are common to the figures. Also, the images in FIGS. 1-9 and 16-19 show aspects of the invention that are simplified for illustration purposes and may not be depicted to scale.

DETAILED DESCRIPTION OF THE SEVERAL EMBODIMENTS

The present disclosure may be more readily understood by reference to the following detailed description presented in connection with the accompanying drawing figures, which form a part of this disclosure. It is to be understood that this disclosure is not limited to the specific conditions or parameters described and/or shown herein, and that the terminology used herein is for the purpose of describing particular embodiments by way of example only and is not intended to be limiting of the claimed disclosure.

As used herein and in the appended claims, the singular forms "a", "an" and "the" include plural referents unless the context clearly dictates otherwise. Thus, for example, reference to "a support" may include a plurality of such supports and reference to "an electrode" includes reference to one or more electrode, and so forth.

Also, the use of "or" means "and/or" unless stated otherwise. Similarly, "comprise", "comprises", "comprising", "include", "includes" and "including" are interchangeable and not intended to be limiting. It is to be further understood that where descriptions of various embodiments use the term "comprising", those skilled in the art would understand that in some specific instances, an embodiment can be alternatively described using language "consisting essentially of" or "consisting of."

The device, system, and method provides for a so-called hybrid device that can convert between electrical energy and mechanical energy, and simultaneously, can act as an electroadhesion device. Compared to known devices working only as electrostatic actuators, for example electrical to mechanical energy converters, or as electroadhesion tools, the device, system, or method of the present invention provides for the simultaneous optimization of both electroadhesion and electrostatic actuation of a deformable actuator by a novel electrode arrangement, allowing both orthogonal and fringing electric fields to be maximized. However, the device, system, and method presented herein is also highly versatile, as actuation and electroadhesion forces can be turned on one at a time or both simultaneously simply by applying suitable control voltages, while retaining a very simple architecture.

Figure 1:
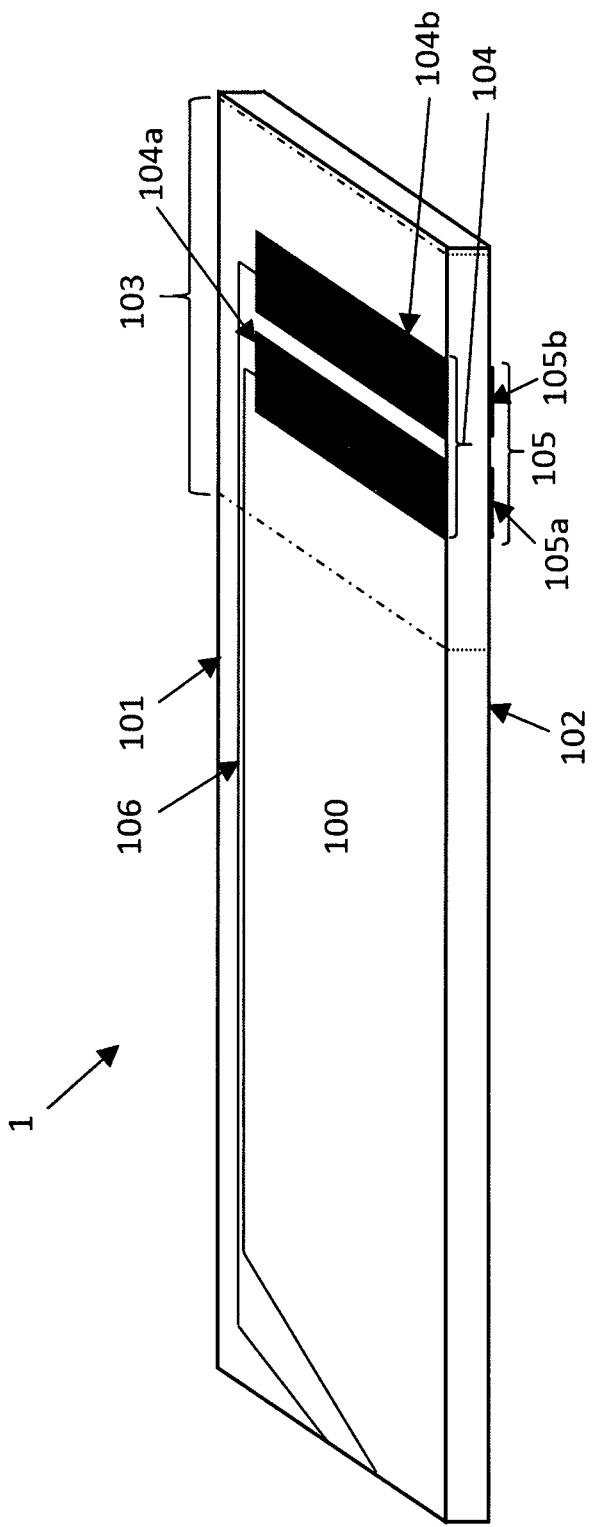
FIG. 1 depicts one embodiment of the device according to an aspect of the invention.

As schematically shown in FIG. 1, the transformation between electrical and mechanical energy in the present device, system, or method is based on energy conversion of one or more active areas of a support 100 that is made of electroactive material, for example a polymer, which deflects when actuated by electrical energy. Generally speaking, the device, system and method can use an electroactive polymer having in its simplest embodiment only one active area. Support 100 can be made of an electroactive polymer, preferably a soft dielectric polymer, the support 100 having an upper surface 101 and a lower surface 102, which acts as a support for the other electrically active components of the device 1. A first set of at least two adjacent electrodes is operatively disposed on the upper surface of a first active area of the polymeric support, while a second set of at least two adjacent electrodes is operatively disposed on the bottom surface of the first active area of the polymeric support, and the electrodes of the first set and those of the second set of electrodes are overlapped in pairs along an axis.

The electroactive polymer of the support, in at least the first active area thereof, is arranged in a manner which causes the polymeric support, in at least said first active area, to deflect in response to a suitable change in electric field provided by the two sets of electrodes. However, in some embodiments, the electrodes in the two sets of electrodes can be activated so to create a suitable electrostatic adhesion voltage that produces an electrostatic force between the device and a nearby substrate that is sufficient to maintain a current position of the device relative to said substrate. The polymeric support material between the two sets of electrodes can also as a capacitor insulator, and is configured to substantially maintain the electrostatic adhesion voltage difference between the sets of electrodes. With these features, it is possible to combine both effects of (i) electrostatic actuation and (ii) electrostatic adhesion by acting on the applied voltages, based on a particular positioning of the sets of electrodes on the polymeric support.

With reference to FIG. 1, a device 1 for converting between electrical energy and mechanical energy is provided, and includes a support 100 that is partially or entirely made of electroactive polymeric material, that is a soft, dielectric polymer having an upper surface 101 and a lower surface 102 comprising at least two sets of electrodes 104 and 105 operatively connected and disposed thereon. For the sake of clarity, the wording "operatively connected", "operatively connectable", "operatively connecting" or even "operatively disposed" is used herein to reflect a functional relationship between two or more components of a device or a system, that is, such a wording means the claimed components must be connected in a way to perform a designated function. The "designated function" can change depending on the different components involved in the connection; for instance, the designated function of electrodes operatively connected and disposed into/onto a polymeric support is to deliver electric current so to create a voltage suitable for providing electrostatic actuation of the support and/or electroadhesion. Accordingly, with device 1, system, and method it is possible to use the electroadhesive effect in a practical device that can be used as a soft gripper, having at the same time both the properties of an electroadhesive device and of an electrostatic actuator.

For the device 1, it has been found that electroadhesion can be used with smooth and rough surfaces, with dielectric objects and with metallic objects and is fully electrically controlled, obviating the need for additional actuators to pick up or release an object. A small residual adhesion force after removing the voltage may be present, however, it has been found that the residual force is extremely low for dielectric objects and only remains for a few seconds. However, it has also been found that, for conductive objects, the small residual force can be greatly reduced by operating at low frequency AC voltage rather than DC.

Also, an electroadhesive device according to the background art has been carefully studied, as shown in WO 2008/070201. For example, the electroadhesive device therein includes a deformable surface, a first electrode, a second electrode, and an insulation material. The deformable surface can interface with a surface of a substrate.

The first electrode is configured to apply a first voltage at a first location of the deformable surface. The second electrode is configured to apply a second voltage at a second location of the deformable surface. The difference in voltage between the first voltage and second voltage includes an electrostatic adhesion voltage that produces an electrostatic force between the device and the substrate to maintain a current position of the device relative to the substrate. The insulation material is disposed between the first electrode and the second electrode and configured to substantially maintain the electrostatic adhesion voltage difference between the first electrode and the second electrode.

The electrostatic adhesion voltage uses alternating positive and negative charges on adjacent electrodes. It has been found that as a result of the voltage difference between electrodes, an electric field forms that locally polarizes the substrate and thus causes electrostatic adhesion between the electrodes and the induced charges on the substrate.

The electroadhesive device includes linearly patterned top and bottom electrodes sets on opposite sides of an insulating layer that are laterally displaced among them. Reducing the horizontal distance or gap between adjacent electrodes can significantly improve electroadhesion force. For this reason, such conventional electroadhesive devices need fine electrode patterning, for example a gap between adjacent electrodes of ~50 µm, which can require difficult and costly manufacturing processes. Also, due to the very small gaps, the voltage difference between adjacent electrodes is limited.

The materials used in accordance with one aspect the present invention for support 100 are soft polymers. In the frame of the present disclosure, a "soft" material is any material that is either compressible, reversibly compressible, elastic, stretchable or any combination thereof. Suitable polymers may include, for example, any commercially available silicone elastomer, acrylic elastomer, rubber, polyurethane (PU), polyvinylidene fluoride (PVDF) or combinations thereof.

Materials used may be selected based on one or more properties such as a high electrical breakdown strength, a low modulus of elasticity or the dielectric constant. In some embodiments, the polymer is selected such that it has an elastic modulus comprised between about 1 kPa and about 1 GPa, preferably between 0.1 MPa and 10 MPa, more preferably between 0.5 MPa and 5 MPa. In other embodiments, the polymer is selected such that is has a dielectric constant comprised between about 2 and 10, for instance between about 3 and 5 in the case of silicone and acrylic elastomers.

Electroactive polymers deflect when actuated by electrical energy. Support 100 made of electroactive polymer is a deformable polymer that acts as an insulator dielectric between two electrodes 104a, 105a or 104b, 105b, and may deflect upon application of a voltage difference between the two electrodes. Generally speaking, "deflection" refers to any displacement, expansion, contraction, bending, torsion, linear or area strain, or any other deformation of at least a portion of support 100.

At least two sets of electrodes 104 and 105 comprising at least two adjacent electrodes, in the variant shown, the first set of electrodes 104 has two electrodes 104a, 104b arranged adjacent and parallel to each other on upper surface 101 of support 100, and the second set of electrodes 105 has two electrodes 105a, 105b arranged adjacent and parallel to each other on lower surface 102 of support. At the same time, electrodes 104a and 105a, and electrodes 104b and 105b of different electrode sets form electrode pairs that are arranged to overlap with each other when viewed from a direction that is perpendicular to either upper surface 101 or lower surface 102 of support 100. Thereby, electrodes 104a and 105a, and electrodes 104b and 105b form capacitances with the material of support 100 as a dielectric therebetween. The first and second set of electrodes 104, 105 can be used to apply a voltage difference across a first active area 103 of support 100. In some embodiments, however, electrodes 104a, 104b, 105a, 105b can even be partly or completely embedded within support 100, and can be embedded into support 100 as layers. Support 100 deflects with a change in electric field provided by the top and bottom sets of electrodes 104 and 105. As support 100 changes in size, the deflection, herein also referred to as "electrostatic actuation", is used to produce mechanical actuation or movement. In this situation, an active area 103 is a portion of the support 100 having sufficient electrostatic force to enable deflection of at least active area 103. Active area 103 is preferably a limited portion of support 100 relative to the total area of support 100, and can be defined as portion of a device 1 comprising the support 100 and at least two sets of electrodes 104 and 105, pairs of electrodes from different sets overlapping each other. This arrangement is chosen to prevent electrical breakdown around the edge of support 100 or to achieve customized deflections for one or more portions of support 100.

The change in electric field corresponding to the voltage difference produced by the electrodes 104a-105a and 104b-105b produces mechanical pressure within the electroactive polymer material of support 100. The unlike electrical charges produced by the electrodes are attracted to each other and provide a compressive force between the electrode pairs and an expansion force on support 100 in planar directions, causing the active area 103 of support 100 to compress between corresponding electrode pairs and stretch in the planar directions, see FIG. 7.

According to an aspect of the embodiments of the present invention, device 1 uses a specific spatial configuration and arrangements of the sets of electrodes 104 and 105. As shown in FIG. 1 electrodes 104a, 104b are disposed on upper surface 101, and electrodes 105a, 105b are disposed on bottom surface 102 so to have electrodes overlapped in pairs along an axis, the axis being perpendicular to upper surface 101 or lower surface 102. This configuration serves the dual purpose of providing for the electrostatic actuation for mechanical movements, but also to provide for the electroadhesive properties of device 1, alone or in concomitance with electrostatic actuation, as will be described further below in more details.

As uses herein, "overlapping electrodes" refers to a pair of electrodes placed on opposite surfaces of support 100, in the variant shown surfaces 101 and 102, facing each other with the minimal possible distance between them along the thickness of the support 100, and for which the contact area is maximized upon projection of one electrode on the other. For instance, with reference to FIG. 1, overlapping electrodes are the pairs of electrodes 104a-105a and 104b-105b.

Figure 15:
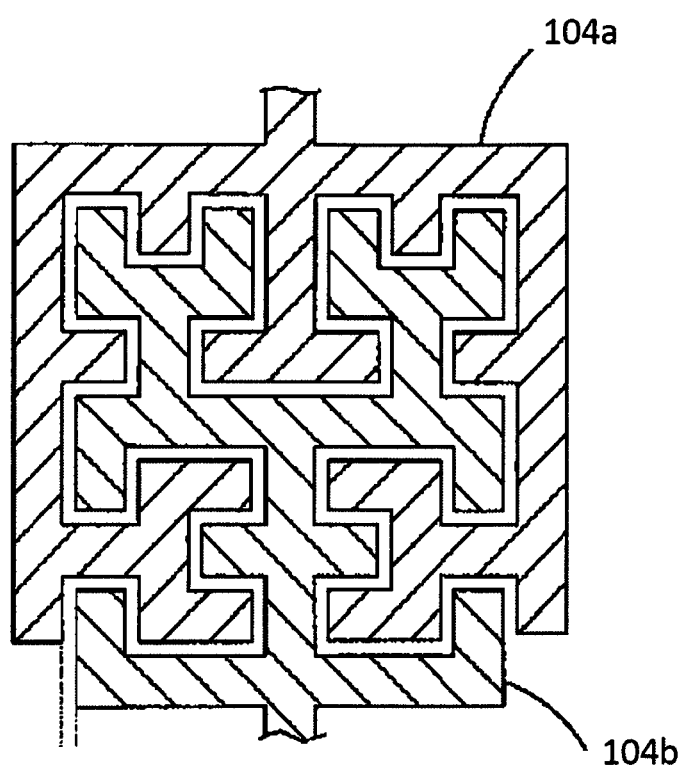
FIG. 15 shows an embodiment for the geometry of the electrodes according to another aspect of the invention.

In general, electrodes that are used for device 1 are configured to supply a suitable voltage, either constant or varying over time, to the electroactive polymer material of support 100, and are also configured to provide for the above-discussed overlapping structure. In a variant, electrodes 104a, 104b, 105a and 105b can have a round, squared, rectangular or parallelepiped shape, and they are attached on surfaces 101 and 102 so that the axes of longitudinal extension thereof, or at least a symmetry axis (e.g., diameter of a round electrode), are substantially parallel and overlapping. In some embodiments, the axes can be substantially parallel and the surfaces of the overlapping electrodes are completely or partially overlapped, preferably with an overlap comprised between about 50% and 100%, more preferably between about 80% and 100%, even more preferably of 100%. Electrodes in each set 104 and 105 are in some embodiments parallel among them, and can be in some embodiments evenly disposed in order to homogeneously distribute the mechanical work provided by a suitable voltage along support 100. In a preferred embodiment, overlapping electrodes 104a-105a and 104b-105b are also substantially identical in surface shape and volume. In some embodiments, 104a-105a and 104b-105b are different in shape, volume, area or combinations thereof. In some embodiments, electrodes can be adapted to have a Hilbert geometry, such as the one shown in FIG. 15.

In preferred embodiments of the invention, the electrodes 104a, 104b, 105a and 105b are compliant and change shape according to a deflection of support 100. A "compliant electrode" is any structure or element able to deliver an electric current, and adapted to change its shape according to the shape change of the support it adheres to without substantially compromising mechanical or electrical performance. Examples of complaint electrodes known in the art include metal thin-films (including patterned electrodes, of out-of-plane buckled electrodes, and corrugated membranes), metal-polymer nano-composites, carbon powder, carbon grease, conductive rubbers or paints, a review of which is provided by S. Rosset et al. "Flexible and stretchable electrodes for dielectric elastomer actuators," Applied Physics A, Vol. 110, Iss. 2, pp. 281-307, February 2013, the entire contents thereof herewith incorporated by reference. In one embodiment, stretchable electrodes as the one described in International Patent Application with the publication no. WO 2004/095536, incorporated herein in its entirety by reference, can be used. In a variant, tubular or plain elements filled with liquid metals such as mercury or gallium, or even alloys, oxides or combinations thereof, can be used.

Support 100 continues to deflect until mechanical forces balance the electrostatic forces driving the deflection. The mechanical forces include elastic restoring forces of the polymer of support 100, the compliance of the electrodes 104a, 104b, 105a and 105b, and any external resistance possibly provided by an external element coupled with the device 1. The deflection of support 100 as a result of the applied voltage may also depend on a number of other factors such as the polymer dielectric constant and its size. Support 100 may be embodied with a wide range of thicknesses. In one embodiment, thickness of support 100 may range between about 1 µm and about 1 mm, more preferably between 50 µm and 250 µm when silicone elastomers are used as material for support.

In one embodiment, support 100 of device 1 is pre-strained in at least a first active area 103 to improve conversion between electrical and mechanical energy. When a voltage is applied to electrodes contacting a pre-strained polymer, the pre-strain improves the mechanical response of support 100 compared to a non-strained polymer, enabling greater mechanical work for a polymer by permitting larger deflections. Pre-strain of a polymer that is used for support 100 may be described in one or more directions as the change in dimension in that direction after pre-straining relative to the dimension in that direction before pre-straining. In a preferred embodiment, the pre-strain may comprise elastic and uniaxial deformation. This can give rise for instance to bended cantilever-like structures able to deflect in a way as to straighten the device 1 upon actuation or vice-versa, with various actuation angles depending on several parameters such as the applied voltage or the stiffness of the polymeric material of support 100. Pre-strain can be applied uniformly or non-uniformly over all or a portion of support 100, and equally or unequally in different directions. In some embodiments, the pre-strained polymeric material used for support 100 may be rolled or folded into actuators that deflect axially upon actuation, an advantageous way to compact the device 1. Support 100 is pre-stretched by a percentage that is preferably in the range of about 1% to about 500%. In some embodiments, the pre-stretch is applied in one or multiple direction. After the pre-stretch step, surfaces 101 and/or 102 can even show in some embodiments a wavy or buckled profile.

Suitable actuation voltages for pre-strained polymers used for support 100 may vary based on the type of electroactive polymer material used for support 100 and its properties, for example but not limited to the dielectric constant, as well as the dimensions of the polymer, for example but not limited to the thickness between sets of electrodes 104 and 105. For example, actuation voltage for the polymer 100 may span from about 100 V to about 100 kV. Actuation voltages for a particular polymer may be reduced by increasing the dielectric constant, decreasing polymer thickness and decreasing the modulus of elasticity, for example.

A suitable actuation voltage can be applied to device 1 via operative connection with a power supply 110 (see FIG. 16) either directly or through a circuitry 106 configured to provide a voltage between overlapped electrodes (i.e. 104a-105a and 104b-105b) in different sets of electrodes 104 and 105. In a preferred embodiment, the conversion between electrical and mechanical energy is provided by applying a voltage creating opposed charges in each overlapped electrode (i.e. 104a-105a and 104b-105b) of different sets of electrodes 104 and 105, and equal charges in adjacent electrodes (i.e. 104a-104b and 105a-105b) of each set of electrodes. Combining different ways to arrange active areas on a polymer, different ways to constrain a polymer, scalability of electroactive polymers to both micro and macro levels, physical and mechanical properties of the used materials and different polymer orientations or pre-strains, permits a broad range of different designs for the actuators.

Figure 16:
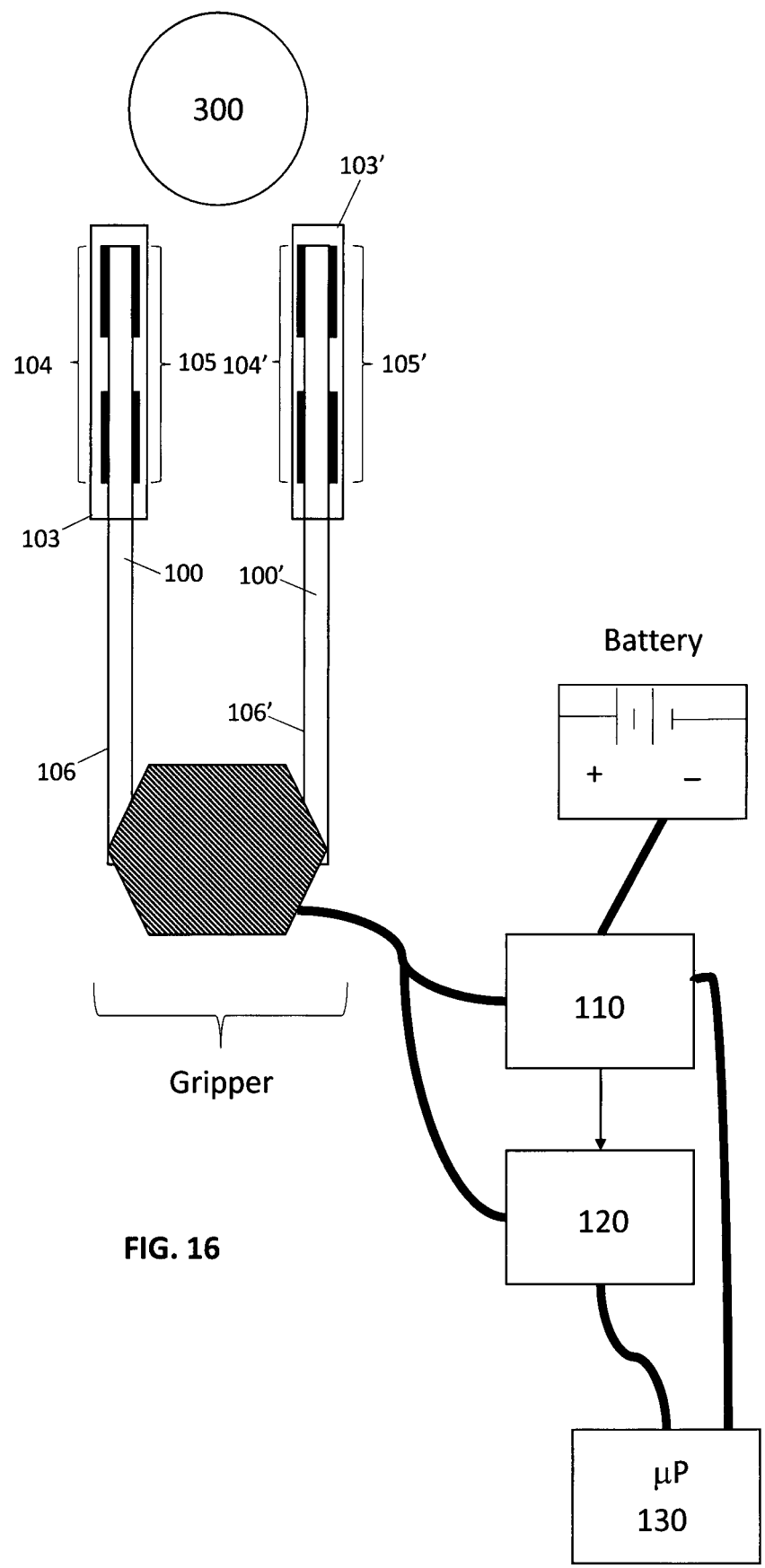
FIG. 16 shows a system according to one aspect of the present invention, with a gripper 1, and object 300 to be gripped, power and measurement modules 110, 120, and a controller 130 for controlling the operation and methods performed with gripper 1.

In one embodiment shown in FIG. 16, a system is provided that includes an object 300 to be gripped, a gripper 1 including two supports 100, 100', two active areas 103, 103', a power supply 110 connected with circuitry 106, 106' to provide for voltages to charge the electrodes 104, 105, 104', 105', a measurement device 120 that is also connected to circuitry 106, 106' to measure different electric characteristics of gripper 1, and a controller 130 such as a microprocessor, microcontroller, personal computer, or another hardware processor configured to control the charges of the sets of electrodes 104, 105, 104', 105'. For example, power supply 110 can perform voltage step-up or conversion between AC and DC power, and can receive power from an external or embedded battery, controlled by controller 130. The controller 130 can also be connected to measurement module 120 that allows to measure capacitances or other electric characteristics of the pairs of electrodes that are arranged to overlap with each other. For example, it is possible that measurement module 120 generates a high frequent excitation signal in the form or repeated pulses that is superimposed to the power voltage from the power supply 110, and applied to all the pairs of electrodes. The high frequency excitation signal can thereby be used to measure different features related to the capacitance of the electrode pairs, for example to determine an absolute value of a corresponding capacitance, changes of the capacitance, and timely evolution of the capacitance. Based on these measured values, the controller 130 can determine shearing forces and pressures that are applied to the first active area 103 and the second active area 103'.

Figure 2:
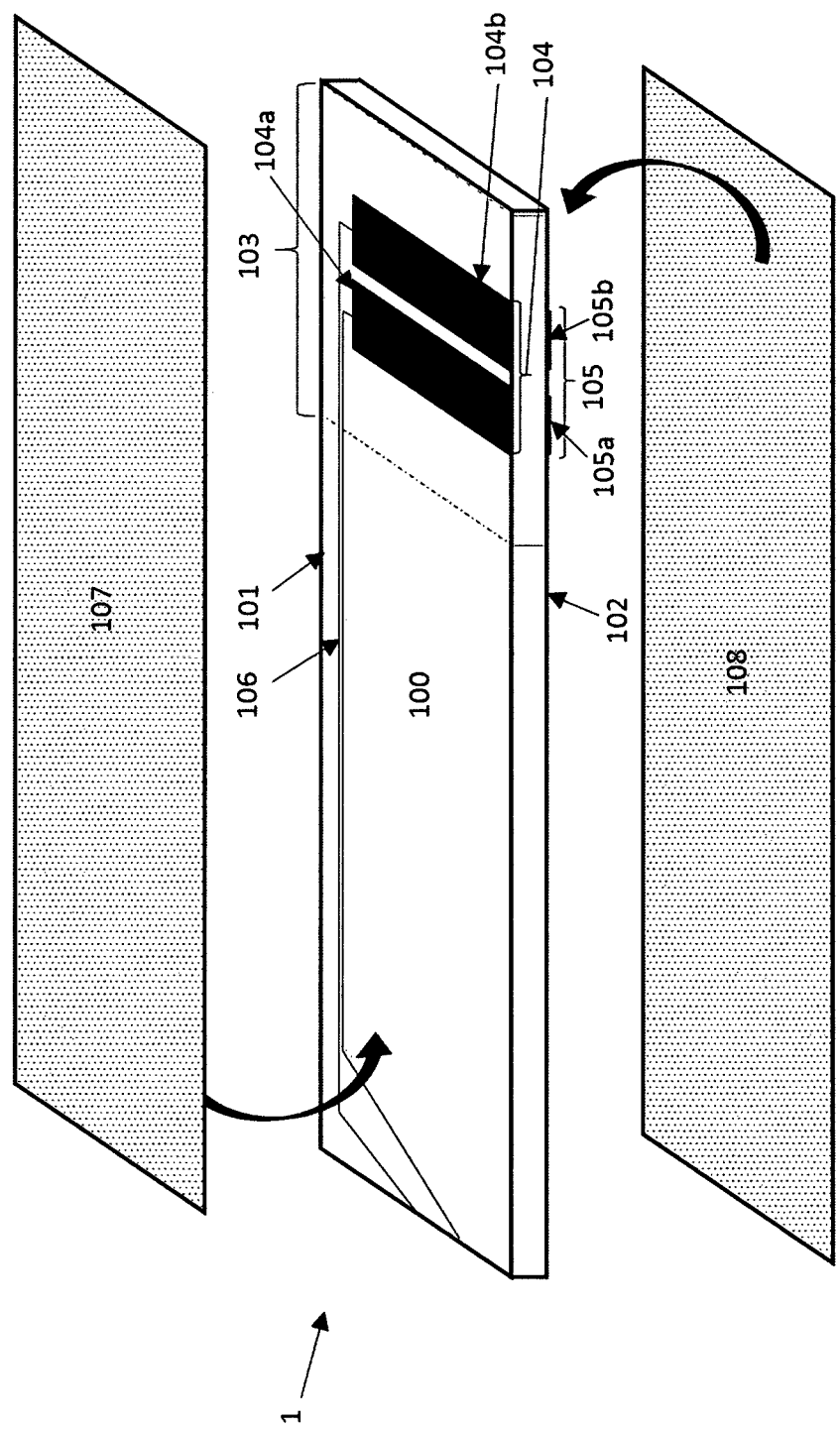
FIG. 2 depicts another embodiment of the device according to another aspect of the invention showing a top and bottom insulating layers.

In another embodiment as shown in FIG. 2, device 1 includes a first deformable insulating layer 107 operatively connected on the upper surface 101 of support 100, and at least covering the first set of electrodes 104, and a second deformable insulating layer 108 operatively connected on the lower surface 102 of support 100, and at least covering the second set of electrodes 105. The insulating layers 107 and 108 serve to insulate the electrodes to avoid electrical breakdown between adjacent electrodes or short-circuit via contact with an external object. Moreover, by modulating mechanical parameters, such as elastic modulus and thickness of the layers 107 and/or 108, one can modulate in turn the functional performance of the device 1 such as the actuation stroke or the actuation force. Layers 107 and 108 preferably comprise an insulator material such as any commercially available silicone elastomer, acrylic elastomer, rubber, polyurethane (PU), polyvinylidene fluoride (PVDF), polyimide (PI), glass-reinforced epoxy laminate sheet, polyethylene terephthalate (PET) or combinations thereof, and are preferably operatively sized to tune the above-mentioned performance of device 1. For instance, layers 107 and 108 can have the same or different thicknesses, preferably ranging from 1 µm to 1 mm. The thickness of the insulation layer in contact with external objects is preferred to be the same or larger than support 100, to avoid breakdown through an object especially when this is a conductive one. The thickness of the insulation layer in the bending actuation direction is preferably lower than the other to orient the bending direction. The thickness ratio of the two insulation layers has also an impact as it changes the bending stiffness, therefore, the amount of the bending actuation and the initial shape. Also, insulating layers 107 and 108 can deform according to actuation and therefore deflection of all or part of support 100. Moreover, insulating layers 107 and 108 can be pre-stretched as for support 100, and as an alternative to the pre-stretch of support 100.

Figure 3:
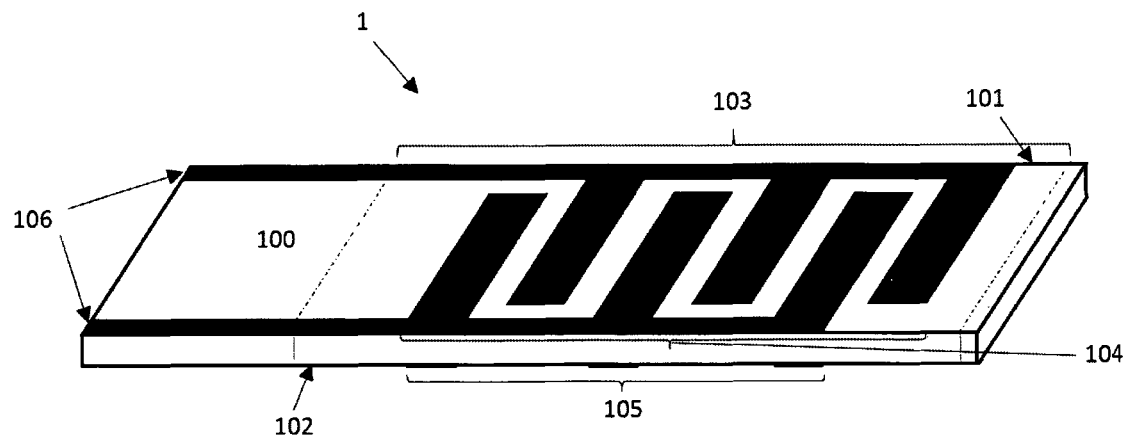
FIG. 3 depicts another embodiment of the device according to an aspect of the invention, wherein the sets of electrodes have several electrode elements arranged in an interdigitated configuration.

FIG. 3 shows an embodiment of device 1 in which the sets of electrodes 104 and 105 comprises several parallel, evenly spaced electrodes arranged in an interdigitated fashion. For the sake of clarity and ease of understanding, as in all the other figures, relative dimensions and positioning of the components of device 1 shown in FIG. 3 are expressly exaggerated and do not necessarily reflect their real arrangements and dispositions.

Figure 4:
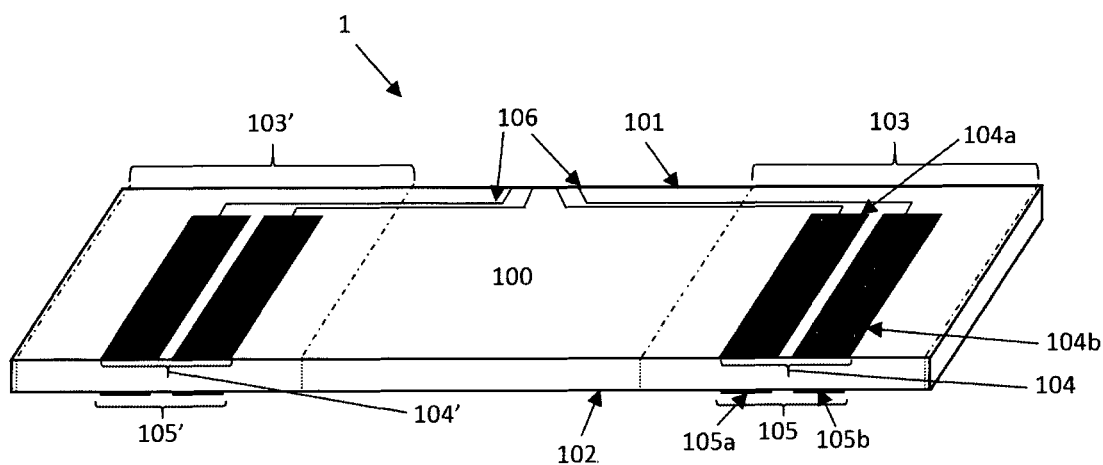
FIG. 4 depicts another embodiment of the device having two active areas according to yet another aspect of the invention.

In one embodiment, device 1 may include a plurality of active areas. The active areas can be functionally arranged within the device 1 to accomplish different actuation performances. For example, in some embodiments, active areas can be arranged such that the elasticity of the active areas is balanced, for example by symmetrically disposing electrodes constituting the active areas along support 100. Several active areas, having electrodes of various shapes, can be also uniformly disposed in a squared or round support 100. With reference to FIG. 4, an exemplary embodiment is shown with device 1 having two active areas 103 and 103', each having electrodes sets 104, 105, 104' and 105' on the upper 101 and bottom 102 surfaces of the polymeric support 100. The first active area 103 and the second active area 103' are disposed on opposite sides of support 100. This arrangement is particularly suitable, as will be detailed further below, when device 1 is intended for use as a soft gripper. Both sides of support 100, especially a pre-strained one, can be deflected upon application of a suitable actuation voltage to get the opposite sides closer, and acting as a two-fingered gripper to pick an external object suitably placed between the two sides of the device 1.

According to another embodiment, device 1 can also be used as a sensor, by measuring the capacitance between pairs of electrodes. In addition, measuring resistance change of the electrodes when in use could also be exploited for sensing an amount of deflection of the device 1.

According to another aspect of the present invention, due to the high versatility of the device 1, also an electrostatic adhesion effect can be provided in the device 1 by applying a voltage via a power supply to create alternating unlike charges in adjacent electrodes of the same set of electrodes and equal charges in each overlapped electrode of electrodes from different electrode sets. Electroadhesion uses electrostatic forces of attraction produced by an electrostatic adhesion voltage, which is applied using electrodes in an electroadhesive device. The electrostatic adhesion voltage produces an electric field and electrostatic adherence forces. When the electroadhesive device and electrodes are positioned near a surface of an object, the electrostatic adherence forces hold the electroadhesive device in position relative to the surface and object. Therefore, electroadhesion can be also defined as the temporary and detachable mechanical coupling of two objects using electrostatic forces. This can be used to increase traction or maintain the position of the electroadhesive device relative to a surface. Electric control of the electrostatic adhesion voltage permits the adhesion to be controllably and readily turned on and off by controlling the applied voltage. The novel configuration of device 1, having sets overlapping electrodes, allows to have fine vertical distance along support 100 thickness by just using a thin elastomer membrane, for example a layer having a thickness of 50 μm, leading to a significantly improved adhesion force without fine electrode patterning.

Figure 5A:
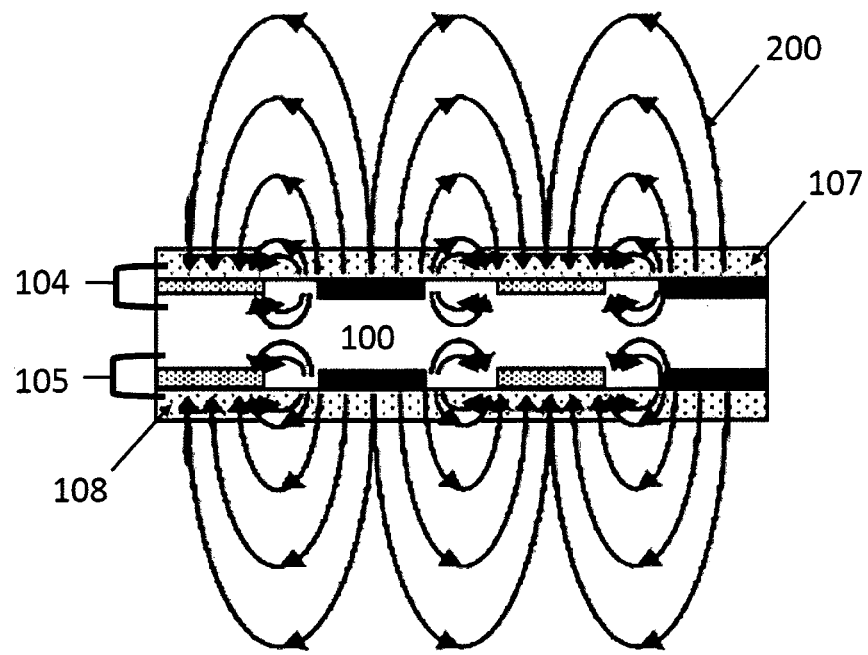
FIG. 5A depicts the device according to an aspect of the invention in which a suitable electroadhesive voltage is applied.
Figure 5B:
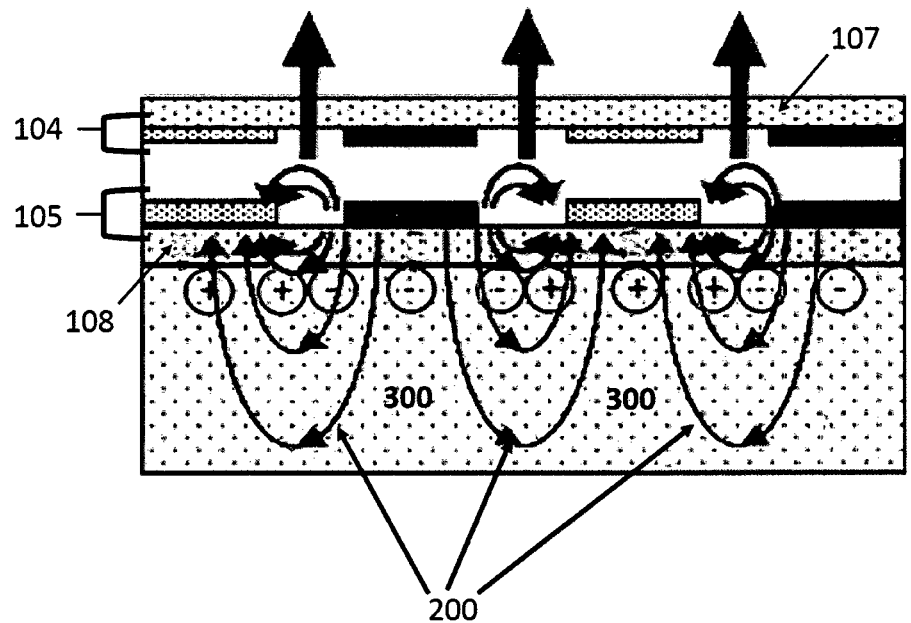
FIG. 5B depicts the electrostatic interaction between the device and a dielectric object according to another aspect of the invention.
Figure 5C:
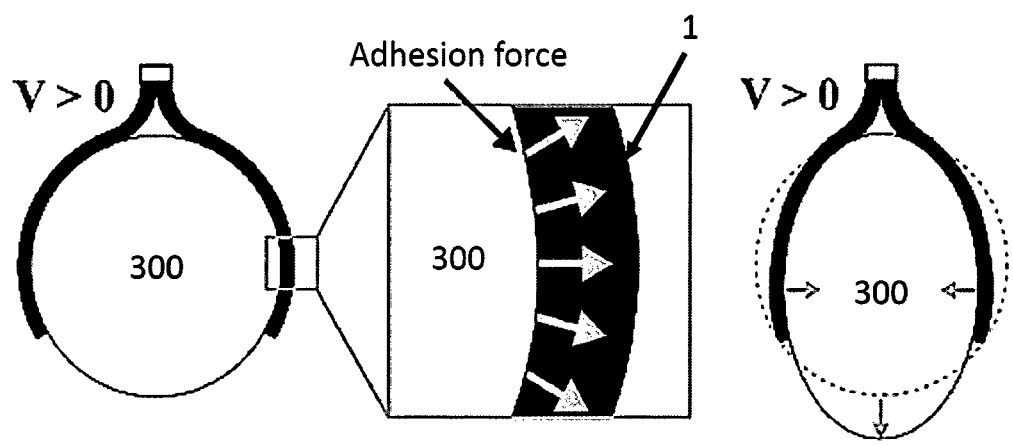
FIG. 5C depicts the electrostatic shear force provided by two devices on an external object, according to still another aspect of the invention.

For instance, with reference to FIG. 1, a suitable electroadhesive voltage can be applied by connecting a power supply to circuitry 106 so that the pair of electrodes 104*a* and 105*a* are positively charged and the pair of electrodes 104*b* and 105*b* are negatively charged. With this arrangement, adjacent electrode pairs will have opposite charging polarity. This particular arrangement is shown in FIG. 5A, where the lines of the electric field are also shown. As result of the voltage difference between the electrodes, an electric field 200 forms in support 100 of device 1 that locally polarizes an object 300 operatively disposed in the near vicinity on its surface, and thus causes electrostatic adhesion between the device 1 and the polarized object 300 (FIG. 5B). Moreover, the electrostatic adhesion (arrows in the inset) voltage provides an electrostatic shear force between the device 1 and the object 300 that maintains the relative position once device 1 is displaced (FIG. 5C). Removal of the electrostatic adhesion voltages from electrodes ceases the electrostatic adhesion force between device 1 and the object 300.

The exact mechanism for force generation will also depend on conductivity and dielectric constant of the material used for object 300. Notably, the features of the embodiments are not limited by the electrical characteristics of the substrate being adhered to, because electroadhesion effect works well for both conductive and non-conductive (or insulating) substrates, as in the embodiment shown in FIGS. 5A-5C. In order to finely tune and tailor the electrostatic forces created between device 1 and the object 300 upon electroadhesion, different embodiments regarding dimensions, materials or positioning of the components of the device can be envisaged; for instance, when object 300 is substantially made of a highly conductive material, electrodes 104*a*, 104*b*, 105*a* and 105*b* can be embedded within support 100.

The electroadhesion effect as described herein permits fast clamping and unclamping times and may be considered almost instantaneous, particularly with a response time in a range between about 1 ms and about 1 s. The speed may also be increased by several means, such as for instance by regulating the materials used in terms e.g. of lightness or compliance, the distance and the size of the electrodes or the applied voltage, this latter being an important parameter also for what concerns a suitable electrostatic force to couple the device 1 to an object 300. In this context, a suitable electrostatic adhesion voltage includes a differential voltage between the electrodes that is comprised between about 100 V and about 10 kV. The electroadhesion forces and pressure will vary depending on a number of factors of the design. In one embodiment, the device 1 provides electroadhesive attraction pressures between about 1 Pa and about 1 MPa. The amount of force needed for an application may be achieved by varying the contacting surface of the device 1. Increasing the voltage and the size of the components of the device 1, or decreasing the distance between the electrodes, increases total electroadhesion forces. For instance, the pitch, or planar spacing between individual electrodes 104*a*-104*b* or 105*a*-105*b* in sets 104 and 105, may vary. The pitch represents the spacing between electrodes of different polarities on the same surface 101 or 102 of support 100. Narrower pitches and widths of the electrodes allow faster clamping to more insulating or resistive objects, while wider pitches and widths attract the device 1 to the object 300 from a greater distance. In some embodiments, the pitch between the electrodes can be non-uniform to allow a variety of geometric electric fields to be setup.

According to one aspect of the present invention, device 1 provides the possibility to apply suitable voltages in each set of electrodes so to obtain not only a conversion of electrical energy into mechanical energy to provide for a gripping force, but also an electroadhesion effect, either alone or in concomitance with the electrostatic actuation. In other words, the features of device 1 allow to provide for two different effects in a single device. Therefore, in one embodiment, the conversion between electrical and mechanical energy is provided concurrently with a strong electrostatic adhesion by applying a voltage creating alternating unlike charges in adjacent electrodes of each set of electrodes, and at the same time, opposed charges in each overlapped electrode of different sets of electrodes. With this feature, it is possible to link robust mechanical actuation performances with a strong electroadhesion effect, in an unprecedented fashion, based on the specific configuration of the electrodes and their activation. In other words, with a specific electrode structure on support 100 of device 1, and the above-described actuation by a power supply, it is possible to provide two different functions without the need of additional actuators, electrodes or other mechanical means to implement the dual functionality.

Figure 6:
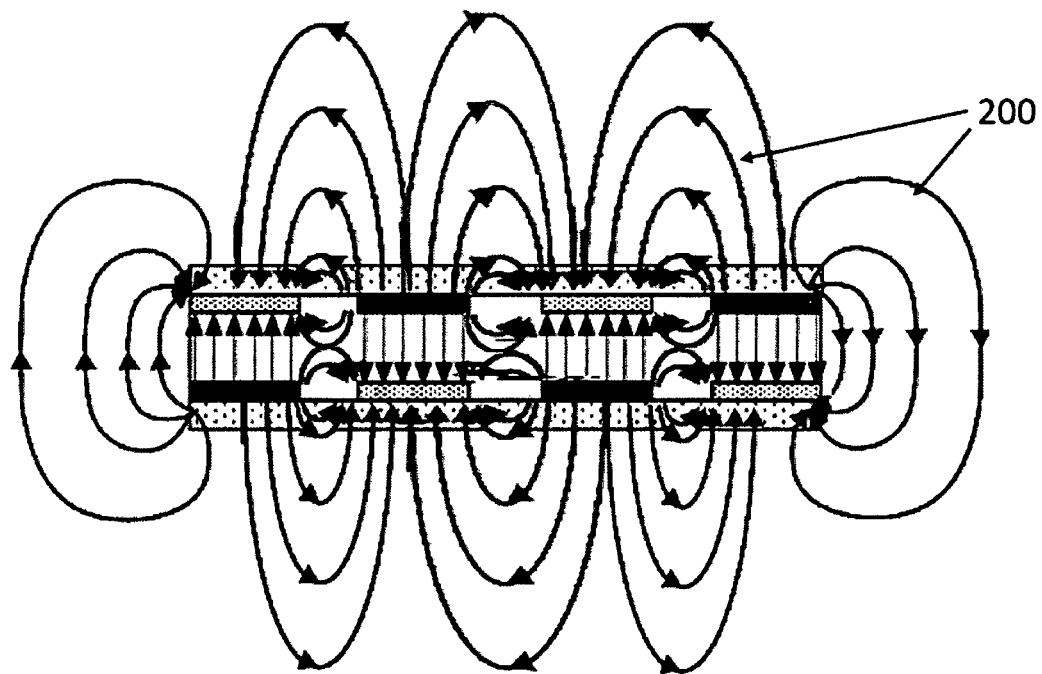
FIG. 6 depicts the activation of the device according to one aspect of the invention with a voltage suitable for providing electroadhesion and electrostatic actuation at the same time.

In this scenario, shown in FIG. 6, the electrodes are activated so that adjacent electrodes on the same planar surface, for example electrodes 104*a*-104*b* and 105*a*-105*b* on surfaces 101 and 102, respectively, are at opposite potentials, as are those electrodes that overlap each other across the polymeric support, for example electrodes 104*a*-105*a* and 104*b*-105*b*. When a voltage is applied across the electrodes, fringe electric fields are generated at the segmentation boundaries, providing homogeneous adhesion forces over the entire surface, contrary to conventional dielectric actuators that can generate adhesion forces only at the periphery of an active area. However, the same applied voltage also provides strong electrostatic actuation in at least the active area 103 where electrodes directly overlap.

Figure 7:
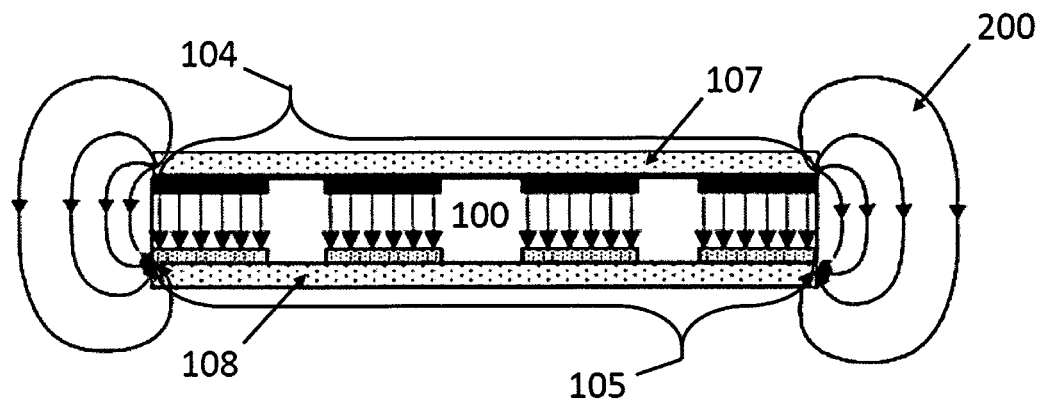
FIG. 7 depicts the activation of the device according to an aspect of the invention with a voltage suitable for providing electrostatic actuation, where a fringe electric field, providing a small electroadhesion effect, is present at the boundaries of the device.

As shown in FIG. 7, even when only suitable electrostatic actuation voltages are provided, the charges on the electrodes may also create small fringe electric fields at the edges of the electrodes. These fringe fields can generate electroadhesion in nearby objects, as the electric fields induce polarization of surface charges on the objects, resulting in attractive forces to the charges on the electrodes. However, in electrostatic actuation applications, these forces are usually ignored due to their minimal impact in application such as e.g. grasping, and their use had therefore not been reported to date.

Figure 8A:
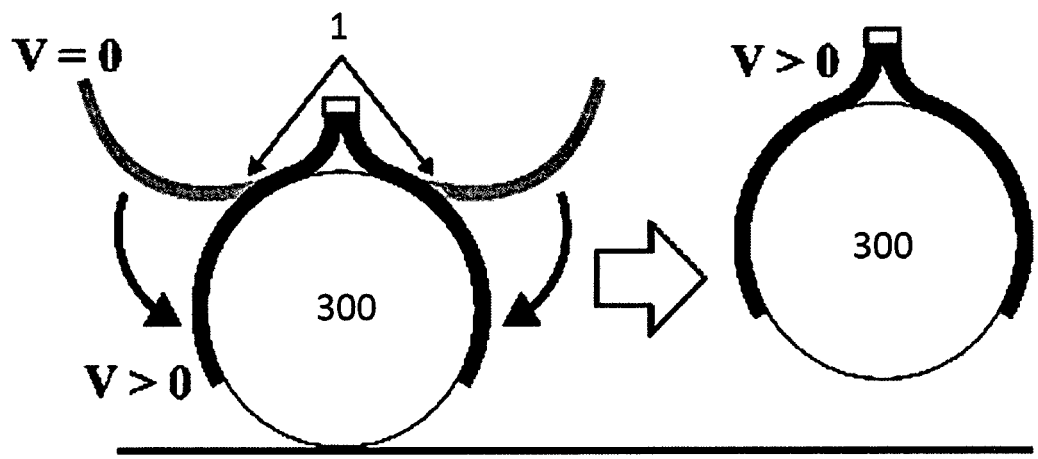
FIGS. 8A and 8B depict the interaction with a soft gripper comprising two devices according to an aspect of the invention with a round external object (FIG. 8A) and a flat object (FIG. 8B)

In accordance with an aspect of the present invention, with the device, system, and method it is possible to provide for an element of a gripper, in particular an operative element of a shear gripper. One aspect of the invention refers therefore to a system comprising a device 1 as previously described operatively connected to a movable load-bearing structure and a power supply configured to electrically connect to one or more electrodes, wherein upon application of a voltage to the one or more electrodes via the power supply, the device provides electrostatic adhesion with possible conversion of electrical energy to mechanical energy, thereby causing adhesion to an object situated proximate to an active area and a shear force to be applied to the adhered object, via the load-bearing structure. The shear force can be made sufficiently strong to move the adhered object. Such a system can allow the picking, placing or otherwise handling of objects that are large, irregularly shaped, dusty and/or fragile, and with no use of suction, chemical adhesives or significant mechanical normal forces against the objects, see FIG. 8A.

As used herein, a "shear gripper" is a system that can electro-adhesively adhere or attach to an object and exerts a force on the object at least partially parallel to the surface of the item that is adhered to. The shear gripper can include a load-bearing structure coupled to the device(s) 1 to distribute and/or convey the resulting shear forces (i.e., the force between two surfaces that is directed, at least in part, parallel to a plane in which two surfaces meet or interact) to load-receiving and/or load-exerting elements. According to another aspect of the present invention, a shear gripping method is provided, that uses a device 1 as described above.

In the system, device 1 acts as the gripping element through gripping surfaces that correspond to one or a plurality of active areas, for example but not limited to active area 103. These areas are configured to be placed against a first surface region of an object 300 having a three-dimensional shape, and can even be adapted to be moved independently with respect to each other. The system can also comprise a plurality of devices 1 operatively connected to the movable load-bearing structure that can be activated via suitable voltages in different ways. For example, one or more active areas of one of more devices can be provided with an electrostatic actuation voltage, an electroadhesive voltage or a combined voltage as previously described, depending on the needs. The strategic use of multiple devices according to some aspects of the present invention can overcome many of the drawbacks associated with e.g. traditional mechanical pick and place processes, such as for robotics or other manufacturing applications.

In some embodiments, device 1 can be activated so to behave as a finger or a hand, which make them especially suitable for soft robotics applications. For example, an electrostatic actuation that allows the device 1 to wrap an object, with or without a strong electroadhesive effect provided in parallel, can permit to conformably adhere to an object 300 as shown in FIG. 5C. Based on the hybrid actuation/electroadhesion nature of device 1, it is possible to create a completely soft gripping system that does not requires rigid parts for the mechanical actuation, as in the past. Moreover, by finely tuning the applied voltage in each active area, electroadhesive and/or mechanical forces can also be used to e.g. modulate friction on the gripping surface, to reposition objects by controllably sliding objects within or about the gripping surface.

In some embodiments, the active areas of the plurality of devices 1 in the system or method are configured to adhere to same, opposite or otherwise different sidewalls of the object 300. While classical mechanical crushing or pinching forces typically need to oppose each other, according to an aspect of the present invention, where electroadhesive forces are used, no such opposing mechanical force components are needed. This allows to grip and pick up objects with much smaller contact force or pressure. Moreover, based on the substantially soft nature of the elements of uses for device 1, these latter can be suitably shaped so to conform to any kind of object, and can take the form of a flat panel or sheet or be studied to have a rigid or semi-rigid geometry to adapt to common objects such as cylindrical ones.

Device 1 as described above advantageously allows for a unidirectional electrostatic actuation thereof, possibly concomitant with electroadhesion performances depending on the applied voltage, which represents the key feature of the device itself. According to some additional aspects of the invention, a device 1000 is provided for converting between electrical energy and mechanical energy and for providing electrostatic adhesion for gripping objects, wherein the device is configured to deflect in a bidirectional fashion. With such bidirectional actuator and electroadhesion device, additional functions can be envisioned and implemented compared to a unidirectional device as described above, as well as novel applications can be covered that cannot be performed or implemented with a unidirectionally-actuated device, for example the device 1 described above.

As exemplary depicted in FIG. 17 showing an exploded perspective view of different layers, device 1000 includes a first and a second partial devices 1 and 1', each having (a) a soft dielectric polymeric support with an upper surface and a lower surface, (b) a first set of at least two adjacent electrodes operatively disposed in/on the upper surface of a first active area of the polymeric support, and (c) a second set of at least two adjacent electrodes operatively disposed in/on the bottom surface of a first active area of the polymeric support. Moreover, at least one deformable insulating layer 109 is placed between the first and said second partial devices 1 and 1', allowing to operatively connect devices 1 and 1' with each other. Device 1000 is hereinafter referred to as the "bidirectional device." The partial devices 1 and 1', for the sake of convenience, will be also referred to hereinafter as "the unidirectional device(s)", and the numbering of the elements composing them will be kept the same. Preferably, the first set of electrodes and the second set of electrodes in each partial device 1 and 1' are overlapped along an axis. Preferably, all electrodes of both partial devices 1 and 1' are overlapped along an axis.

Figure 17A:
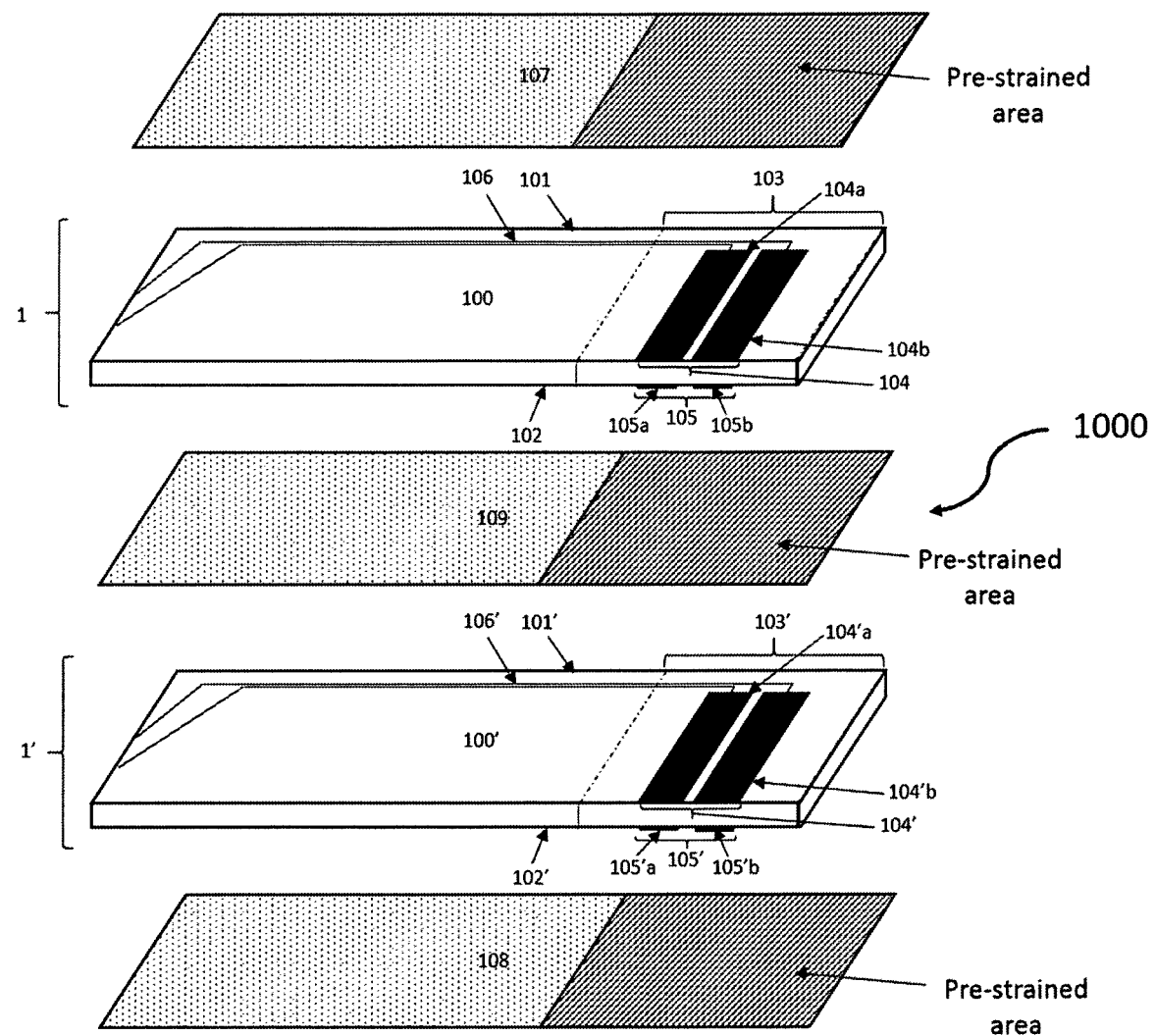
FIG. 17A show an exploded perspective schematic view of a bidirectional gripping device 1000 that can be operated bidirectionally for adhesion and gripping.

As depicted in FIG. 17A, in one embodiment the device 1000 preferably further comprises a first deformable insulating layer 107 operatively connected on the first active area of the first partial device 1 and a second deformable insulating layer 108 operatively connected below the first active area of the second partial device 1'. Moreover, preferably, in one embodiment, the electrodes 104, 105 and 104', 105' in each set of each partial device 1 and 1', respectively, are arranged in parallel to each other, along a longitudinal extension of the electrodes. Moreover, preferably, in one embodiment, all electrodes 104, 105, 104', 105' of both partial devices 1 and 1' are parallel among them. In addition, in another embodiment, the electrodes in each set of each partial device 1 and 1' are preferably evenly disposed. Moreover, preferably, in one embodiment all electrodes of both partial devices 1 and 1' are preferably evenly disposed. Furthermore, in one embodiment, preferably the electrodes are compliant. Moreover, device 1000 further includes for each partial device 1 and 1' a circuitry 106, 106' configured to provide a voltage between adjacent electrodes of each set of electrodes and/or between overlapped electrodes in different sets of electrodes upon connection with a power supply.

In one embodiment, the conversion between electrical and mechanical energy is provided in a bidirectional fashion by applying in the first partial device 1 a first voltage creating opposed charges in each overlapped electrode of different sets of electrodes and equal charges in adjacent electrodes of each set of electrodes, followed by application in the second partial device 1' of a second voltage creating opposed charges in each overlapped electrode of different sets of electrodes and equal charges in adjacent electrodes of each set of electrodes. In one embodiment, the first and the second voltage have the same amplitude, but different voltages in the partial devices 1 and 1' can be envisaged. For example, a particular bending angle can be achieved by several combination of voltage differences. In one embodiment, the first and the second voltage are provided in a sinusoidal fashion, but any kind of signals such as cosine, pulse, triangle, saw tooth, etc., applied by providing a phase shift, can be used.

In one embodiment, the polymeric support of each partial device 1 and 1' is elastically pre-strained on at least the first active area thereof. Different pre-strains in the partial devices 1 and 1' can be used to have, for example a bending angle at the rest state, when no voltage is applied to the electrodes.

In one embodiment, the electrostatic adhesion is provided, for each partial device 1 and 1', by applying a voltage creating alternating unlike charges in adjacent electrodes of each set of electrodes and equal charges in each overlapped electrode of different set of electrodes.

In one embodiment, the conversion between electrical and mechanical energy is provided concurrently with the electrostatic adhesion, in each partial device 1 and 1', by applying a voltage creating alternating unlike charges in adjacent electrodes of each set of electrodes, and opposed charges in each overlapped electrode of different sets of electrodes.

The bidirectional device 1000 described herein allows for new functionalities compared to the unidirectional device 1. The capacity to electroadhere, in other words to establish an electroadherent effect, to target objects through two opposed, facing surfaces provided by the partial devices 1 and 1', as well as the potentiality of moving in opposing directions via an ad hoc electrostatic actuation, is particularly adaptable to situation in which sorting or repetitive movements are sought, especially for objects that are mechanically fragile and need to be handled with low contact pressure or force. Electrostatic surface adhesion can be controlled for both sides of bidirectional device 1000, so that an attraction and adhesion force can be created and controlled on both sides independently. The additional possibility of tailoring and fine-tuning the actuation/electroadhesion voltage in both partial devices 1 and 1' in parallel further contributes to the quick and precise ability performances of such a bidirectional device 1000. Additionally, bidirectional actuation could improve releasing force to de-attach a target object, and one of the two devices or even both can be used as a sensor to detect for instance deflection, object property, object shape, temperature and/or humidity. As will be evident for a person skilled in the art, the bidirectional device 1000 can be advantageously adapted to be used as any of the previously described embodiments relating to a unidirectional device 1, including in a gripping system or for applications related to soft robotics.

Figure 17B:
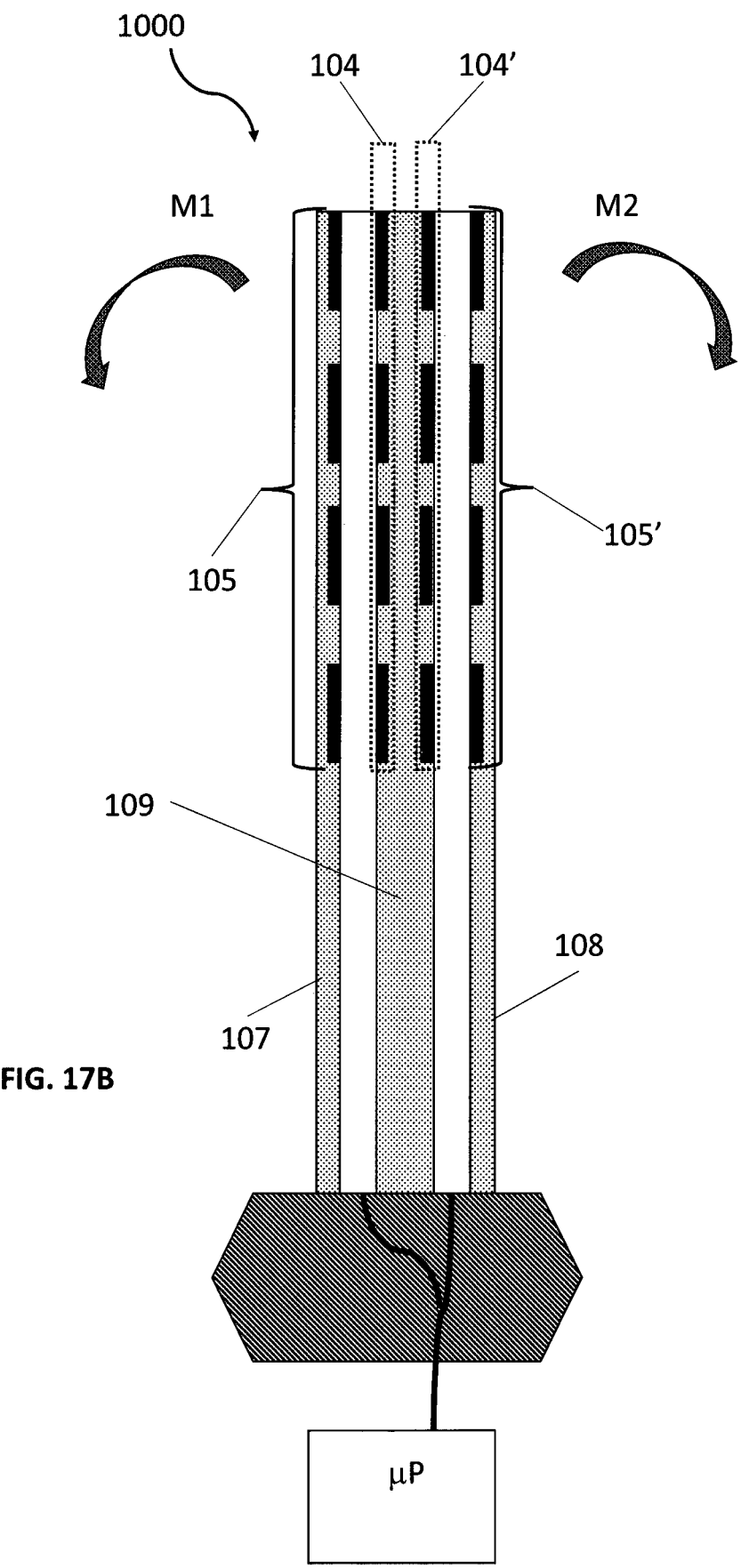
FIGS. 17B-17D show side schematic views of the device 1000 depicting stages of its operation, according to another aspect of the present invention.

For example, FIG. 17B shows a schematic side view of an exemplary bidirectional device or actuator 1000 that can be moved in the direction M1 and M2, having two devices 1, 1' that are attached to each other via a flexible support 109, and outer sides are covered with protection sheets or layers 107, 108. In addition, and simultaneously to the bending in different directions, on a surface or area facing electrodes 105 and layer 107 on the left side, a first electrostatic adhesion force can be created, and on a surface or area facing electrodes and layer 108 a second electrostatic adhesion force can be created.

Figure 17C:
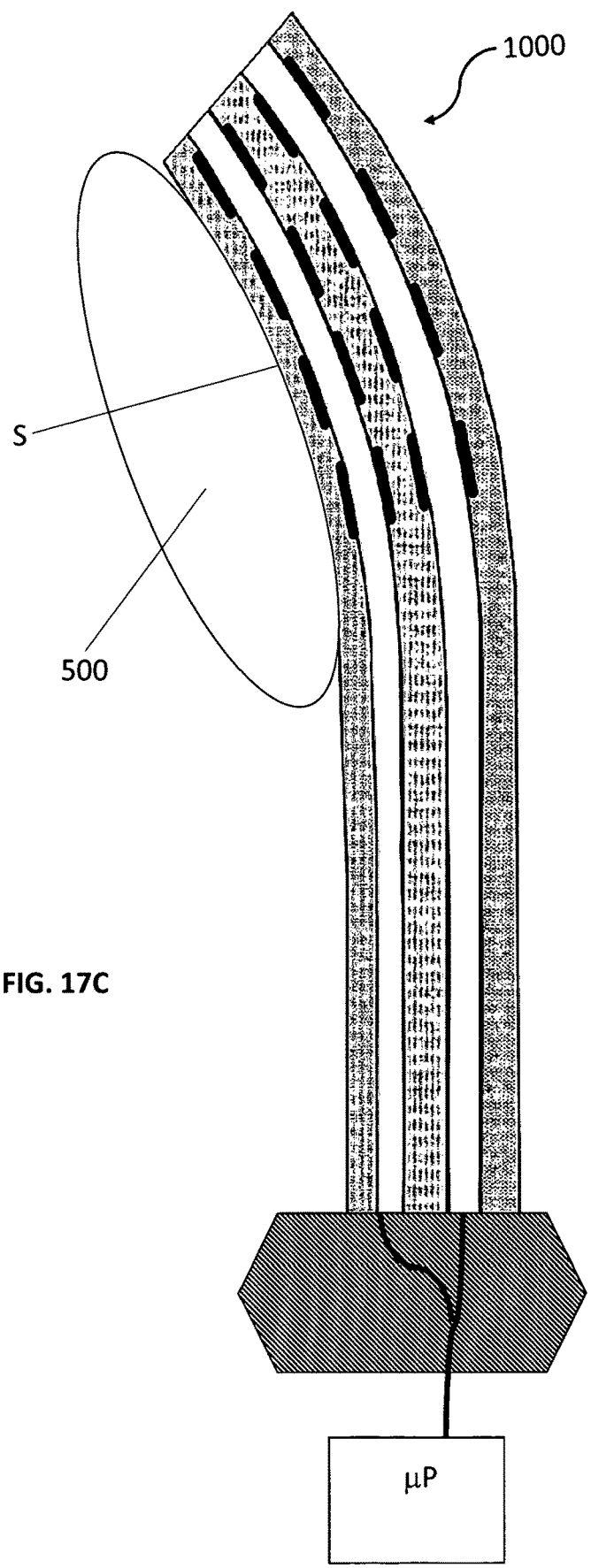
Figure 17D:
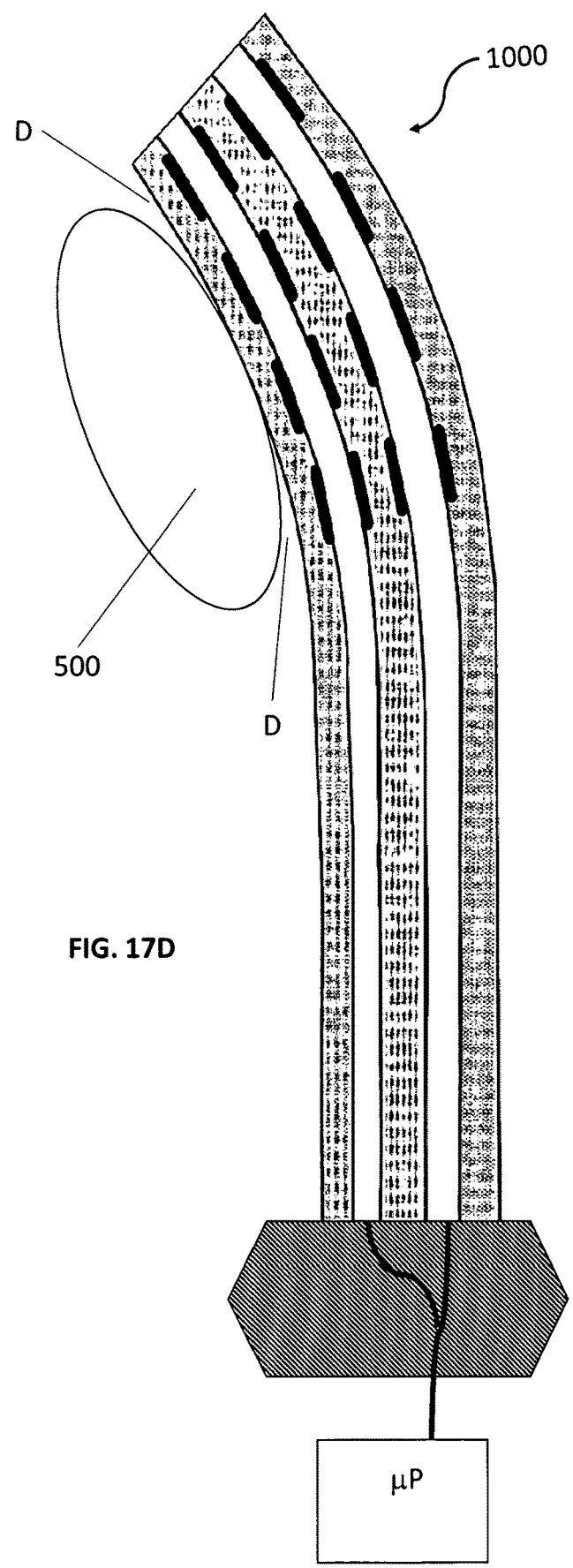

Next, FIG. 17C shows bidirectional device 1000 that has been bent in a direction M1, and creating an electrostatic adhesion force to hold object 500. As can be seen, object 500 has a curved upper surface S, and device 1000 has been bent so that a surface of layer 107 conforms to the surface of object 500, so that a large contact surface is created. This will further increase the electrostatic adhesion force created by electrodes 105, 104. Also, compared to background art gripping robot that have rigid picking fingers or arms, this allows to substantially increase a surface of contact, and thereby allows to reduce a contact pressure between object 500 and device 1000. As shown in FIG. 17D, bidirectional device is bent back in a direction M2, so that the bending radius of the device is larger than a curve radius of upper surface S of object 500. This allows to easier detach device 1000 from object as detachment areas D are created between object 500 and device 1000. For this action, the device 1000 is bent or otherwise moved such that a surface 107 of device 1000 is not curved the same way as the attachment surface S of the object 500. This can be done by increasing or decreasing the bending radius of device 1000, to be different from bending radius of surface S of object 500. In addition, the electrostatic attraction or adhesion force is removed. This can be done simultaneously with the mechanical changing of the bending radius, or can be done before the bending so that the bending will release object 500 from device 1000.

Figure 18:
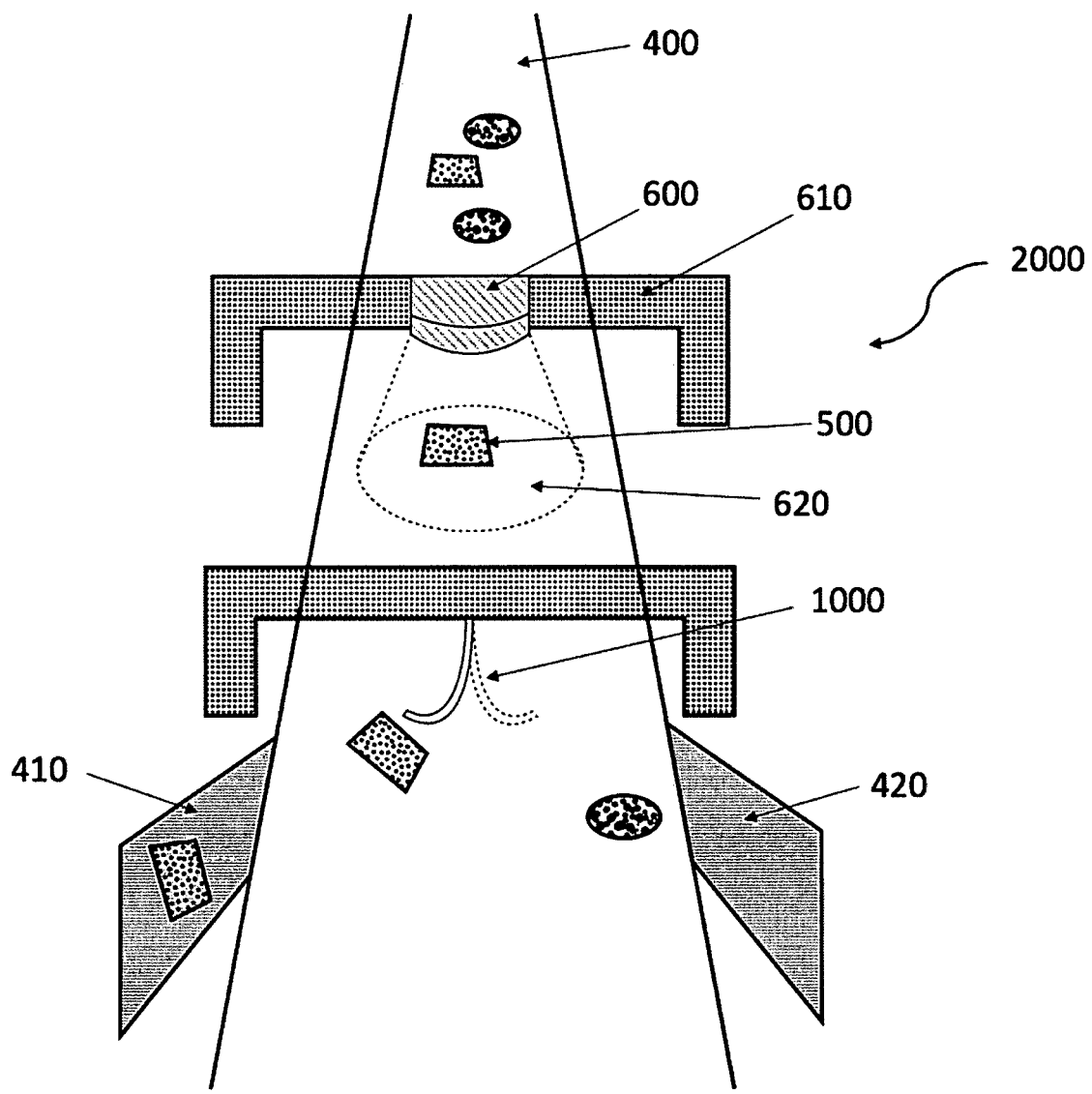
FIG. 18 shows a top perspective view of a system 2000 that uses the bidirectional gripping device 1000 for separating different types of objects 500 from each other.

According to another aspect of the invention, a distribution system 2000 is provided, as schematically shown in FIG. 18 in a top perspective view. System 2000 comprises one or more devices 1000 for converting between electrical energy and mechanical energy and also provide for electrostatic adhesion. Device 1000 can deflect in a bidirectional fashion, both to the left and the right side as referenced to FIG. 18. System 2000 comprises a conveyor belt 400 adapted to transport objects 500 intended to be disposed of or separated one from the others depending on the needs and based on selected features of the object itself, for example but not limited to size, shape, weight, color. System 2000 in preferred embodiments advantageously comprises a detection device 600, such as a camera arranged for instance on a support 610, to capture an image of a portion 620 of the conveyor belt 400 for detecting an object 500 and the associated data thereof, for example but not limited to size, shape, position, color, in the portion 620 of the conveyor belt 400.

The received image data generates status information data associated with the portion of the conveyor belt 620 based on the detected object 500, that in turn are elaborated by a computer device which operatively activates the bidirectional device 1000 to deflect and electroadhere to the incoming object 500 in one direction or the other, by acting on the voltage provided by a power supply on either or both partial device(s) 1 and 1'. The actuation direction of device 1000 is shown to be perpendicular to the moving direction of the conveyor belt 400.

With system 2000, it is possible to perform the following actuation movements. For example, the actuation of the bidirectional device 1000 allows the object 500 to be deviated towards distributing lanes 410 or 420, depending on the needs and according to the information data obtained along a path of the conveyor belt. For example, with this system 2000, first, the device 1000 can be moved such to be in close proximity or in touch with an object 500 that passes by movement of conveyor belt 400. Next, the electroadhesion force can be activated, such that the object 500 attaches to device 1000 with an adhesion force. Thereafter, device can be moved or bent either in the left or the right direction, to move object 500 towards distribution lanes 410, 420, respectively, while still being in contact with device 1000. Next, it is possible to remove the electrostatic adhesion force, so that object 500 is still attached to device 1000, but without additional adhesion force being present. This allows to further push object 500 sideways by device 1000, either in the left or the right direction.

With this way of moving objects 500, it is possible to reduce sudden changes to an attachment force between device 1000 and object 500, for the handling of mechanically fragile objects 500, and also allows to reduce an attachment force as a surface of contact between object 500 and device 1000 can be increased. For example, instead of device 1000 knocking objects by a sudden impact into either the left or right direction, as references exemplarily to FIG. 18, it is possible to create an attachment force between device 1000 and object 500 that is substantially smaller than a mechanical attachment force from a traditional pick-and-place gripping robot. Also, as the device 1000 can conform to a shape of object 500, it is possible to spread out the applied force over a larger surface of contact. With these features, handling of fragile objects is possible.

According to another aspect of the invention, a dispensing system 3000 is described, the system comprising at least a device 1000 for converting between electrical energy and mechanical energy and for providing electrostatic adhesion which deflects in a bidirectional fashion. An exemplary, non-limiting embodiment of the dispensing system 3000 is depicted with different operational stages as a side view in FIGS. 19A-19C. For example, a reservoir or hopper 700 configured to contain a plurality of objects 710 that can be dispensed via dispensing apertures or channels 730, possibly through openable valves 720 disposed at the inlet and/or the outlet of the channels 730, arranged on a lower surface of reservoir 700. Channels 730 typically end in a support 800 that is holding the various outlets of channels 730, and on a lower surface of support, several bidirectional devices 1000 are arranged, configured to moved laterally in two directions. Support 800 could comprise all electronic components used to activate the bidirectional device 1000, including parts of the circuitries 106 and power supply adapted to activate the bidirectional device 1000.

Figure 19A:
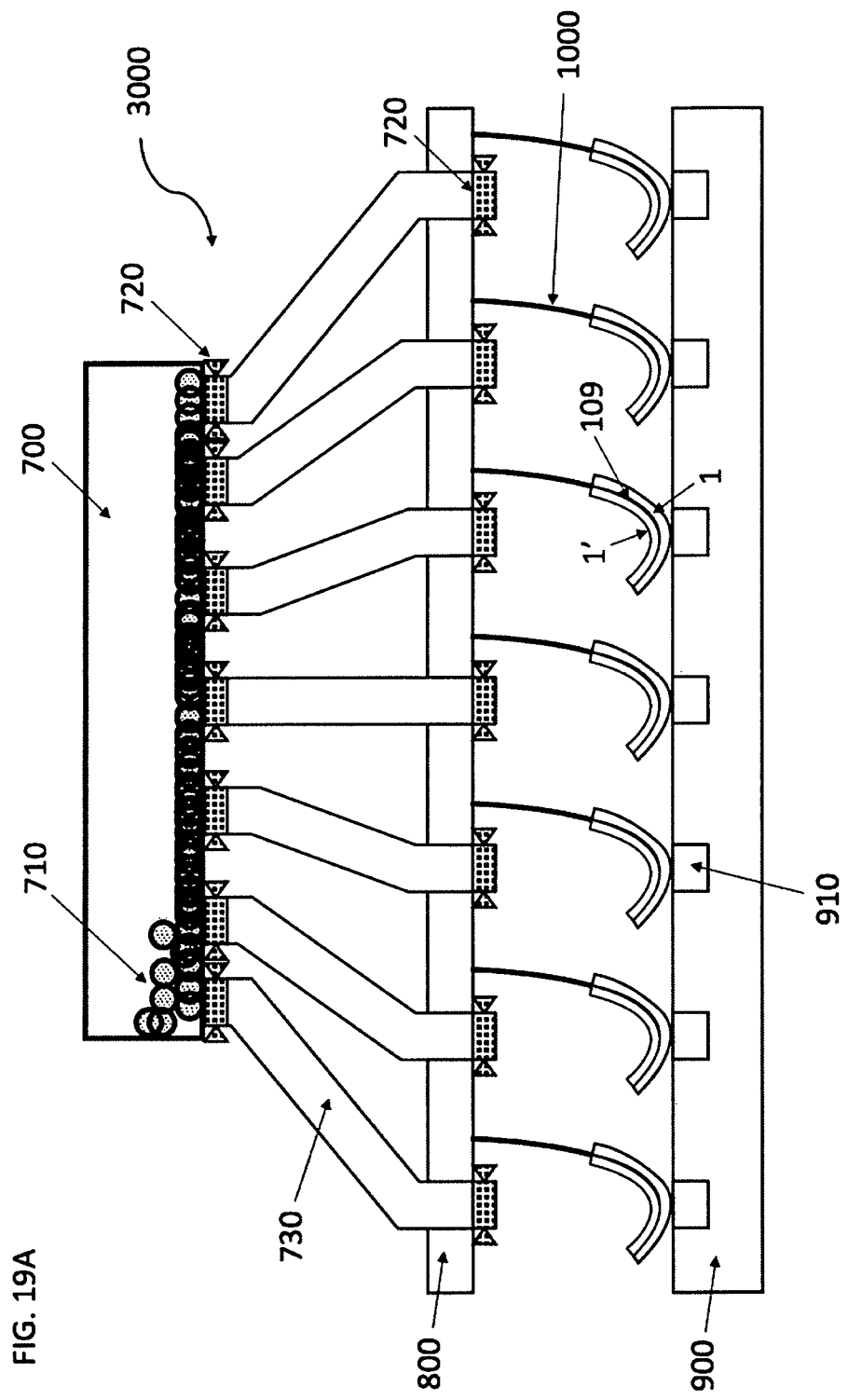

As shown exemplarily in FIG. 19A, in a stand-by position, the one or more bidirectional devices 1000 are activated so to induce an electroadhesion force on one side of the device 1000, for example by first partial device 1. The electroadhesion force of first partial device 1 is imparted onto upper surface of a movable dispensing reservoir 900 designed to accommodate objects 710 to be dispensed in ad hoc pockets, chambers, cavities, or wells 910, in such a way to firmly adhere to the upper surface of reservoir 900. Together with the electroadhesion force of the first partial device 1, a concomitant electrostatic actuation is provided on the second partial device 1' to deflect the bidirectional devices 1000 to the left as referenced to FIG. 19A, to form a u-shaped holding pocket with each device 1000.

Figure 19B:
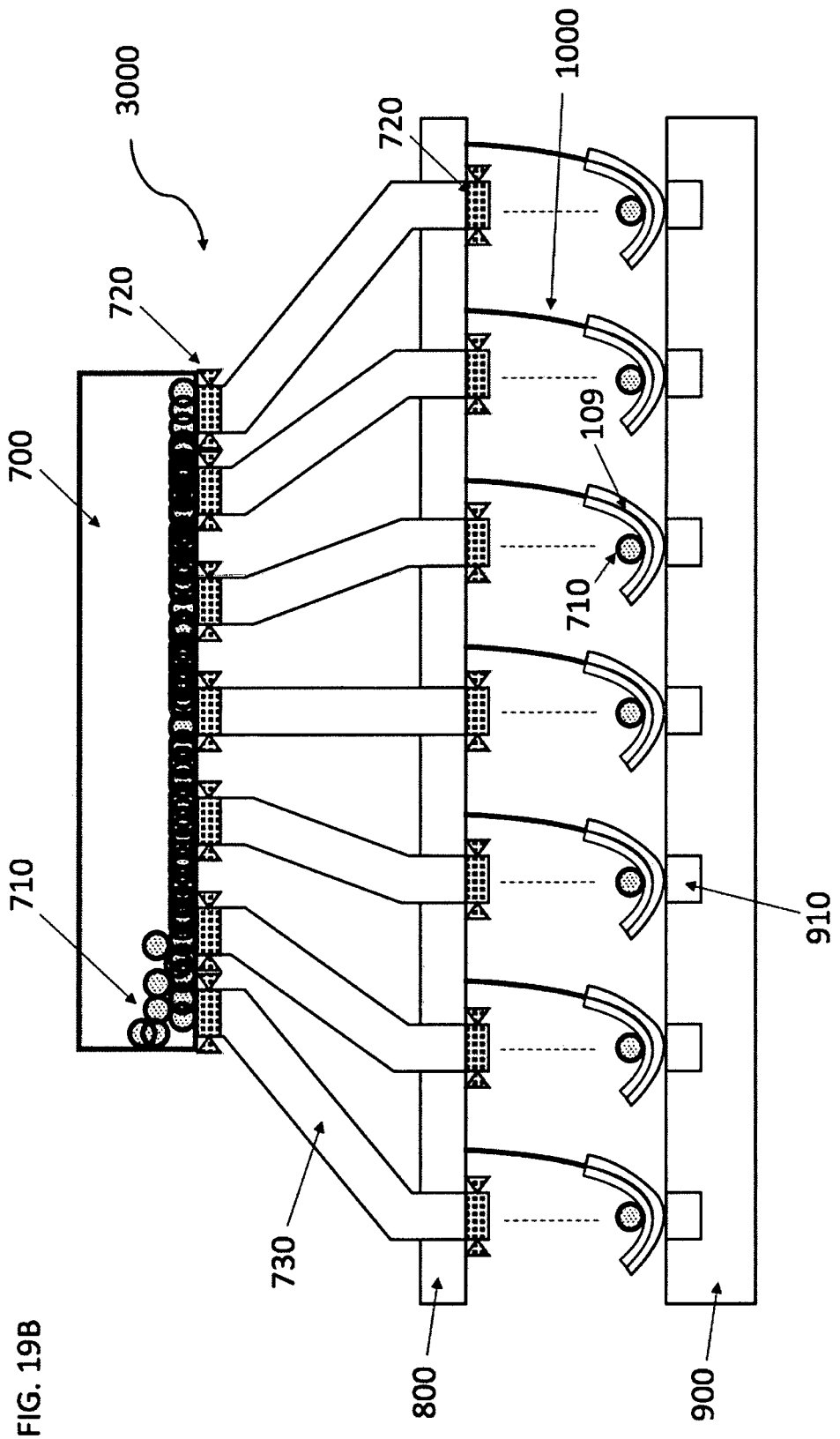

Next, in a following releasing phase that is shown in FIG. 19B, valves 720 are opened so to release objects 710 contained in the reservoir 700 into the dispensing channels 730, and a further voltage is provided to the bidirectional devices 1000 in order to produce an electroadhesive force on an upper surface of second partial device 1', in such a way as to receive and hold objects 710 while firmly keeping them in the u-shaped pockets. This allows to conform at least partially an upper surface of second partial device 1' to object 710 that is forming a pocket, but also provides for an adhesion force between object 710 and second partial device 1'.

Thereafter, in a dispensing phase that is shown in FIG. 19C, an electrostatic actuation is provided through a voltage change on the first partial device 1 in order to deflect the bidirectional devices 1000 to the right direction, i.e. in the opposed direction compared to the stand-by position. This deflection, in combination with the electroadhesion force still being applied onto the upper surface of the movable dispensing reservoir 900, allows to place objects 710 into pockets 910 of reservoir 900, when the reservoir moves in a direction indicated by the arrow. During the displacement of the reservoir 900, the electroadhesion force of the first partial device 1, as well as electroadhesive force and the deflection still present in the second partial device 1' is released. Thereby, object 710 will drop into a respective pocket 910 of reservoir 900. Advantageously, the provision of a sinusoidal electrostatic actuation voltage, switching from one partial device to the other, would allow to smooth and improve the fluidity of the dispensing process.

Figure 8B:
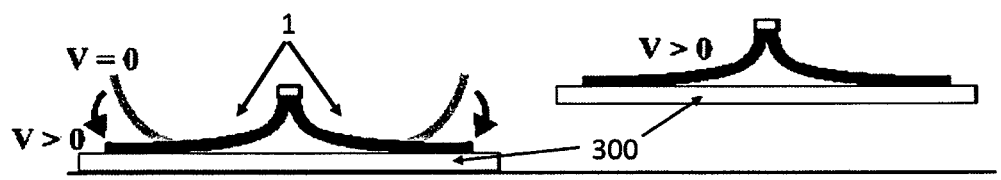
Figure 9:
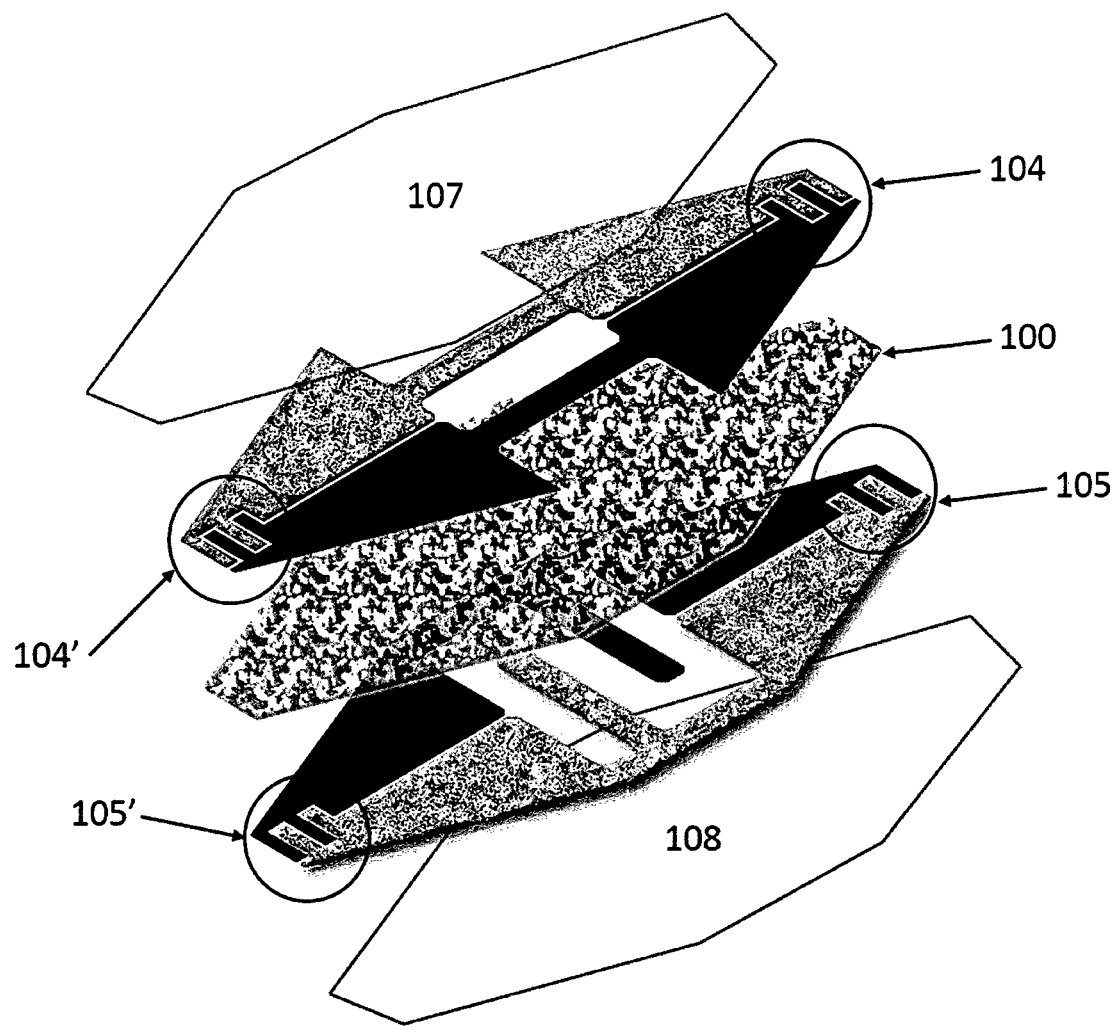
FIG. 9 depicts an exploded view of a soft gripper including a device of the invention having two active areas on the edges thereof.

In another embodiment of the present invention, a two-fingered gripper has been developed and extensively tested, as shown in FIG. 9. The device shown in FIG. 9 weighs 1.5 g, that can pick up a wide range of objects, including fragile, highly deformable or heavy objects, as compared to the weight of the two-fingered gripper itself. These capabilities are enabled by simultaneously maximizing electroadhesion and electrostatic actuation, while allowing self-sensing in a new design of dielectric elastomer actuators (DEA) employing an interdigitated electrode geometry. The mechanical gripping force produced by electrostatic actuation is, in the present exemplary device, of about 1 mN, thereby allowing handling of very fragile objects, while the electroadhesion force can produce high holding force (3.5 N shear force for 1 $cm^2$), thereby at the same time enabling the lifting of heavy objects. Also, due to the bending of the actuators, it is possible to increase a contact surface between object and the two-fingered gripper substantially. The electroadhesion force also enables the picking up of flat and deformable objects, as shown in FIG. 8B. The gripper can be controlled only by a single control voltage based on the simple, compliant composite structure. These features lead to a sensitive, highly versatile, multifunctional conformal soft gripper with fast motion (≈100 ms to close fingers), high holding force, and simplified structure and control.

A feature of the exemplified gripper, essential for instance to reach human-like performance in soft robotic applications, is the simultaneous optimization of both electroadhesion and electrostatic actuation of a bending DEA by a novel electrode arrangement, allowing both in-membrane and fringing electric fields to be maximized, generating over ten times higher electroadhesion force than would be obtained from a conventional DEA electrode configuration. The device is highly versatile, as bending motion and electroadhesion forces can be turned on one at a time or both simultaneously simply by applying suitable control voltages, yet the device retains a very simple architecture.

DEAs are an electrostatically actuated type of electroactive polymer material. They are compliant (≈1 MPa of elastic modulus), fast (response time less than 200 μs, and capable of self-sensing the actuator deformations. The DEA structure consists of a thin elastomer membrane sandwiched between two highly compliant soft electrodes. When a voltage is applied across the membrane thickness (electric fields typically 50-100 V μm-1, for the gripper described herein, 3.5 kV is applied across a 60 μm thick silicone membrane), opposite charges on the electrodes generate an electrostatic pressure (the Maxwell stress) leading to compression of the structure in the thickness direction and expansion in the planar directions, which can eventually lead to bending. The Maxwell stress is proportional to the square of the electric field in the elastomer membrane in the direction normal to the surface.

In the present example, a simple and effective method for simultaneously maximizing both electroadhesion and electrostatic actuation of the device 1 is disclosed, obtained through the segmentation of the compliant electrodes into a bilayer offset interdigitated four electrode geometry as shown in FIG. 9. In order to maximize the electroadhesion force and the electrostatic actuation, the electrodes are wired such that adjacent electrode segments on the same planar surface are at opposite potentials, as are those electrodes that overlap each other across the membrane. When a voltage is applied across the electrodes, fringe electric fields are generated at the segmentation boundaries providing homogeneous adhesion forces over the entire surface (FIG. 6), contrary to conventional designs that can generate adhesion forces only at the periphery. The same applied voltage provides electrostatic actuation in the region where electrodes directly overlap. The exemplary four-electrode configuration enables the same device to generate the following effects: (a) simultaneous electroadhesion and DEA actuation, (b) pure DEA actuation only with negligible electroadhesion, or (c) electroadhesion only with no DEA actuation simply by applying the appropriate voltages to the four electrodes, thus allowing the same device to be reconfigured for different applications by applying different voltages. In addition, as explained above, by measuring changes in the capacities of the capacitors formed by pairs of electrodes, it is possible to measure other mechanical properties, such as applied forces and pressures caused by device 1 onto object 300.

Passive silicone layers, sandwiching the DEA, serve to insulate the electrodes to avoid electrical breakdown between adjacent electrodes or short-circuit via the external object. The bottom passive layer is in contact with the object being picked up. For these passive layers, a stiffer elastomer, Sylgard 184 (≈2.6 MPa of elastic modulus with curing temperature at 150° C.) is used to minimize inherent tackiness, allowing smooth releasing of objects. The bending actuation of the gripper fingers is obtained by using a uniaxially pre-stretched DEA bonded to one or two passive layers. In this configuration, the structure has a curled shape at zero applied voltage where the internal stress of the pre-stretched DEA and the bending moment of the passive layers are at their equilibrium state.

When a voltage is applied, the electrostatic pressure reduces the internal stress in the DEA and releases the bending moment in the passive layers, leading to voltage-controllable bending actuation toward a flat shape. The initial bending angle, the actuation stroke, and the actuation force can be modulated by the mechanical parameters, such as elastic modulus and thickness of both the DEA and the passive layers, and the DEA pre-stretch. The larger percentage change in capacitance of the device as it uncurls enables self-sensing of the bending angle, as reported for other DEAs.

The electroadhesion force is proportional to the fringing fields, which are generated primarily at the electrode edges. For a given area, the total edge length for the interdigitated electrode is much longer than that of a uniform (i.e., no gaps) electrode, based on the gaps between the segmented boundaries. Hence, one expects a much larger total electroadhesion force for an interdigitated geometry than for a uniform geometry, as well as a force nearly uniformly distributed over the area for the interdigitated shape, but only a force localized at the periphery for the uniform shape. The gaps of the interdigitated electrode however lead to a lower electrostatic actuation due to the smaller overlapping electrode area across the DEA membrane compared to the uniform electrode. cThe gaps can be narrowed to maximize DEA actuation, but the gap size must be sufficiently large to avoid electrical breakdown in the passive layer insulating the segmented electrodes. Gaps of the order of 100 μm are needed to withstand 5 kV potential difference, essentially resulting from the breakdown field strength of silicone elastomer, typically 50-100 V $μm^{-1}$. To increase breakdown resistance, a high voltage insulation layer can be provided with support 100 between the electrode sets.

Figure 10:
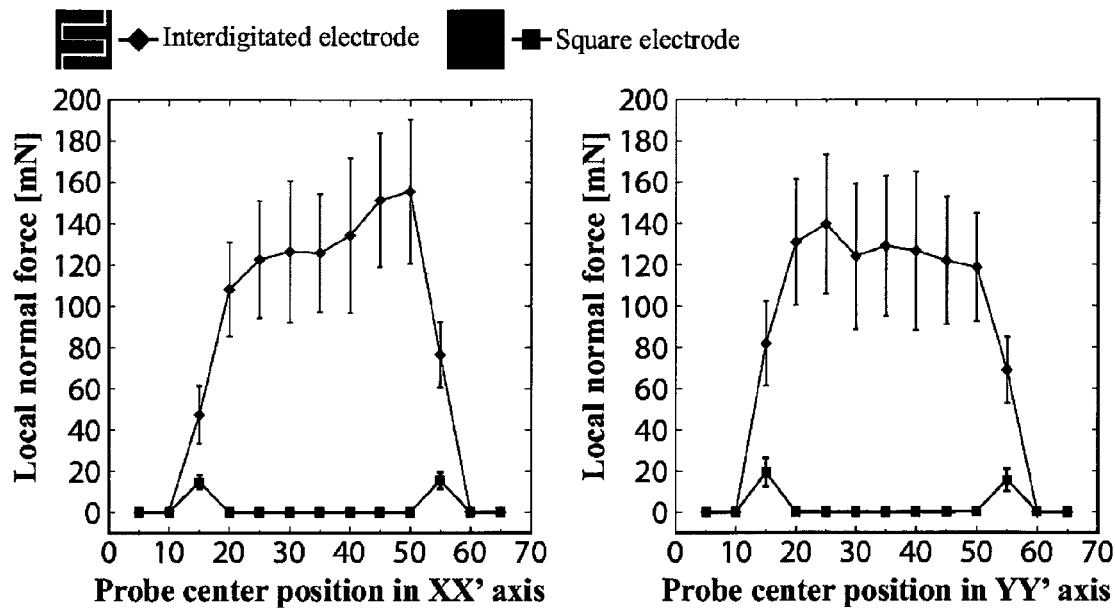
FIG. 10 shows local normal electroadhesion force exerted by an interdigitated electrode design for the active area of the device according to one aspect of the invention over a square design.

Moreover, the impact of electrode geometry on electroadhesion and electrostatic actuation through characterization of experimental devices to address the tradeoff and an optimized design for the gripper has been assessed with a series of experimentations. Two electrode geometries have been used for characterization: an interdigitated shape and a square shape. Firstly, the spatial distribution of the electroadhesion force was investigated. A small force probe of 10 mm diameter was raster over test samples with active electrode area of 40 mm×40 mm in a passive outline dimension of 70 mm×70 mm, while recording the normal component of local electroadhesion force. The thickness of the top and the bottom passive layers are 50 μm, and no measurable stiction between the passive layer and the probe interface is reported. FIG. 10 plots the measured local normal adhesion force at applied voltage of 2.5 kV, and clearly represents the effect of the interdigitated design over the square design. The square electrode generates a local normal force of 15 mN only at the periphery, and a force of less than 0.1 mN for all interior points. For the interdigitated electrode, the local force is much larger and homogeneous over the electrode surface; ≈120 mN on average for all the points on the electrode, more than 1000 times larger force at the interior points compared to the square design. The result proves that the scaling of the electroadhesion force is proportional to the total electrode area for the interdigitated electrode, but only proportional to the periphery length for the square electrode.

Also, for a gripper, the uniform electrode configuration will not enable holding an object smaller than the overall electrode area due to the absence of electroadhesion force at the center. The total electroadhesion force of the interdigitated design can be calculated by dividing the device electrode area (1600 mm$^2$) by the probe area (78.5 mm$^2$), and multiplying the measured local normal force (≈120 mN), as this design scales the adhesion force proportional to area. Similarly, the total adhesion force of the square design can be obtained from the total periphery of the device (160 mm), the probe diameter (10 mm), and the measured maximum local normal force (≈15 mN), based on the fact that this design generates the force only at the electrode periphery.

Figure 11:
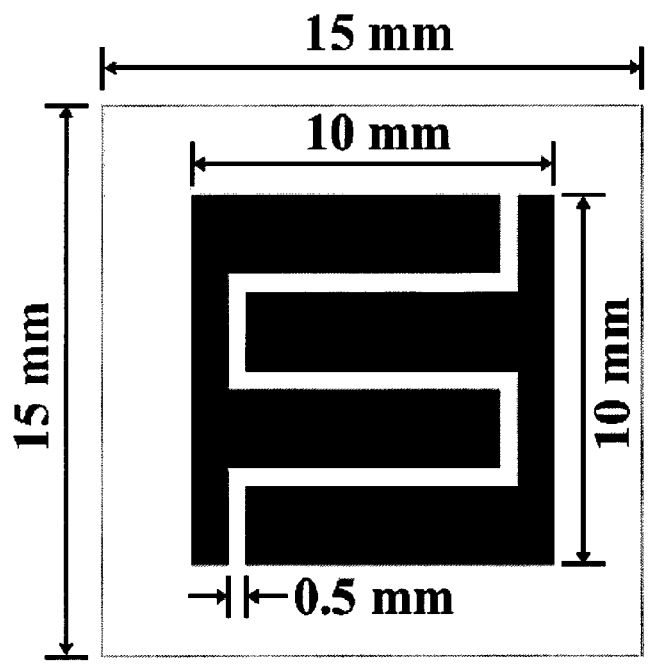
FIG. 11 depicts an interdigitated electrode design for the active area of the device according to another aspect of the invention.

The interdigitated electrode produces ten times higher total electroadhesion force (≈2400 mN) than the square electrode (≈240 mN). The adhesion force scales with the square of the fringe electric field intensity that induces surface charges by polarization for dielectric materials, and by electrostatic induction for conductive materials. The influence of two important parameters—applied voltage (0 V, 2.5 kV, and 5 kV) and bottom passive layer thickness (50 and 400 μm)—on the magnitude of the electroadhesion force was investigated, using simplified devices shown in FIG. 11 that represent one finger of the gripper with active overall electrode area of 10 mm×10 mm with passive outline dimension of 15 mm×15 mm. These devices are smaller than those previously discussed, but are the same size as the gripping part of the gripper, and allow using a probe covering the entire electrode area (10 mm×10 mm) to measure the electroadhesion force in both shear force required to displace the probe, and normal force to detach it from the device.

Figure 12:
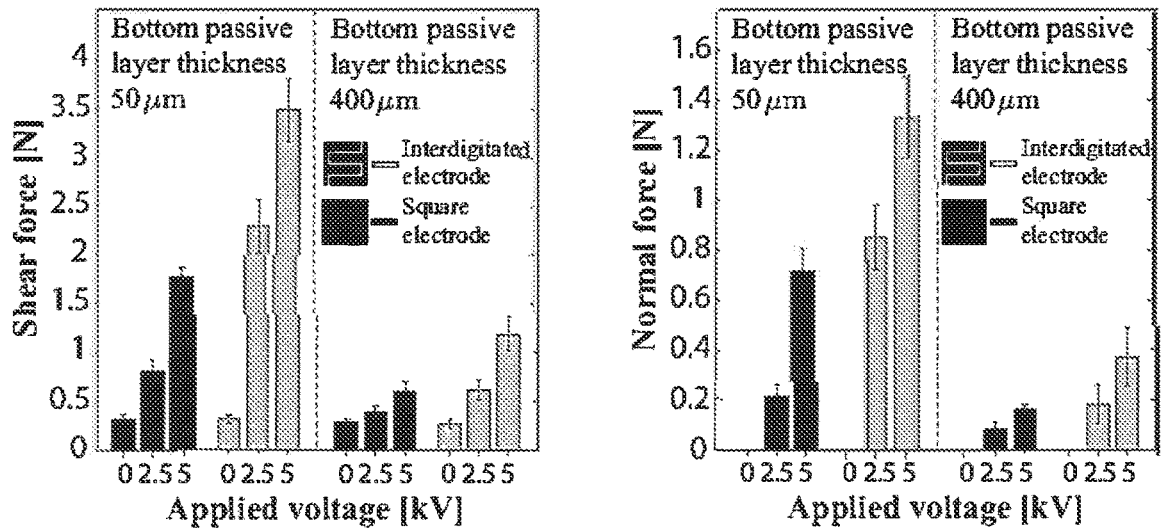
FIG. 12 shows shear force and normal force exerted by an interdigitated electrode design for the active area of the device according to an aspect of the invention over a square design.

The measured shear force plotted in FIG. 12 scales with the voltage and the inverse of the thickness. For the thinnest passive layer, the shear force at 5 kV is 3.5±0.3 N (corresponding to 35±3 kPa given the 10 mm×10 mm overall electrode area) for the interdigitated electrode, and 1.8±0.1 N (18±1 kPa) for the square electrode. The shear forces at zero applied voltage are due to static friction. The measured normal force (FIG. 12) scales with both the voltage and the inverse of the thickness in the same way as the shear force does. Since there is no inherent stiction between the passive layer and the interface, no normal force is seen at zero voltage. The normal force at 5 kV is 1.3±0.2 N (13±2 kPa) for the interdigitated electrode, and 0.7±0.1 N (7±1 kPa) for the square electrode. The factor of two between measured electroadhesion forces for interdigitated and square electrodes is consistent with the ratio of edge lengths producing fringing fields for the two configurations. For a fixed electrode area, one could increase the electroadhesion force dramatically by patterning smaller gaps between the lines to enable longer total edge length. One is ultimately limited by fabrication resolution, electrical breakdown in small gaps, and the reduced penetration depth of the fringing in the object, since the fringing distance scales with electrode gap.

Figure 13:
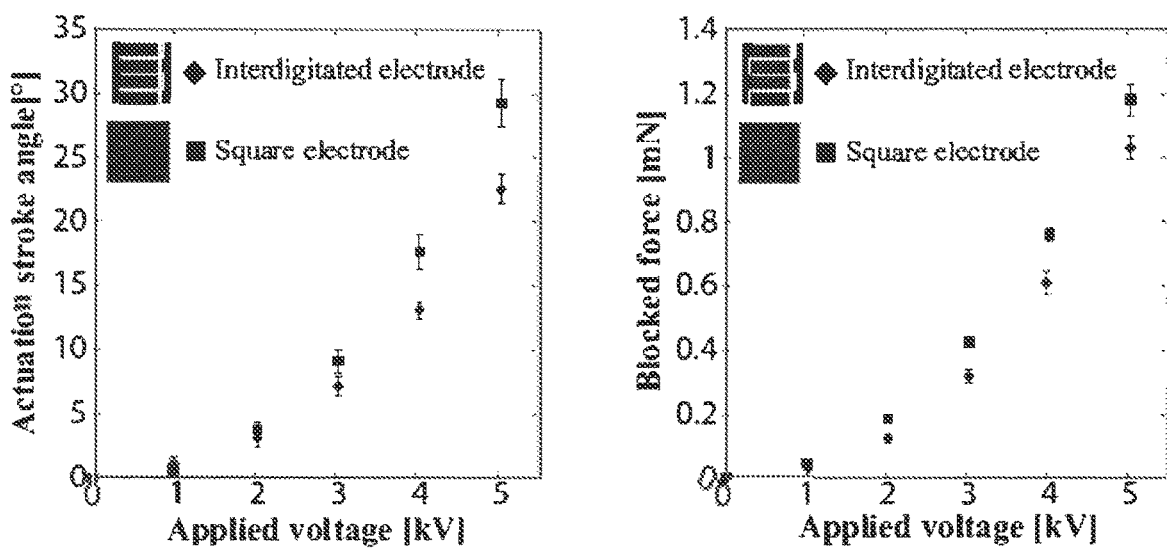
FIG. 13 shows actuation stroke angle and the blocked force exerted by an interdigitated electrode design for the active area of the device as compared to a square design according to an aspect of the invention.

The actuation stroke angle and the blocked force was then characterized as functions of the applied voltage, using the same simplified devices with the bottom layer thickness of 400 μm. FIG. 13 plots the measured actuation stroke angle and the blocked force, and shows that the reduction of the actuation performance for the interdigitated electrode due to the gaps is only ≈20% compared to the square electrode. The reduction corresponds to smaller electrode overlap area, 83.75 mm$^2$, in the interdigitated electrode and 100 mm$^2$ in the square electrode for the simplified devices. The magnitude of the blocked force is in the mN order, three orders of magnitude smaller than the electroadhesion force, representing the low mechanical grasping force of the gripper allowing handling of fragile and deformable objects, while the holding force is provided mostly by the shear electroadhesion force. The fact that ten times higher electroadhesion force with only 20% reduction of the actuation performance can be generated from the interdigitated electrode design clearly shows the advantage for this design.

To demonstrate the versatility at picking up and releasing different types of objects, a two-fingered soft gripper was manufactured as represented in FIG. 9. This simple structure is lightweight (≈1.5 g) and allows for fast movement (≈100 ms to close the fingers). The geometry of the electrodes is designed to provide stronger adhesion forces around the fingertips by the fine interdigitated segmentation, and the other sections generate larger actuation stroke. The gripper is successful at handling various objects.

Figure 14:
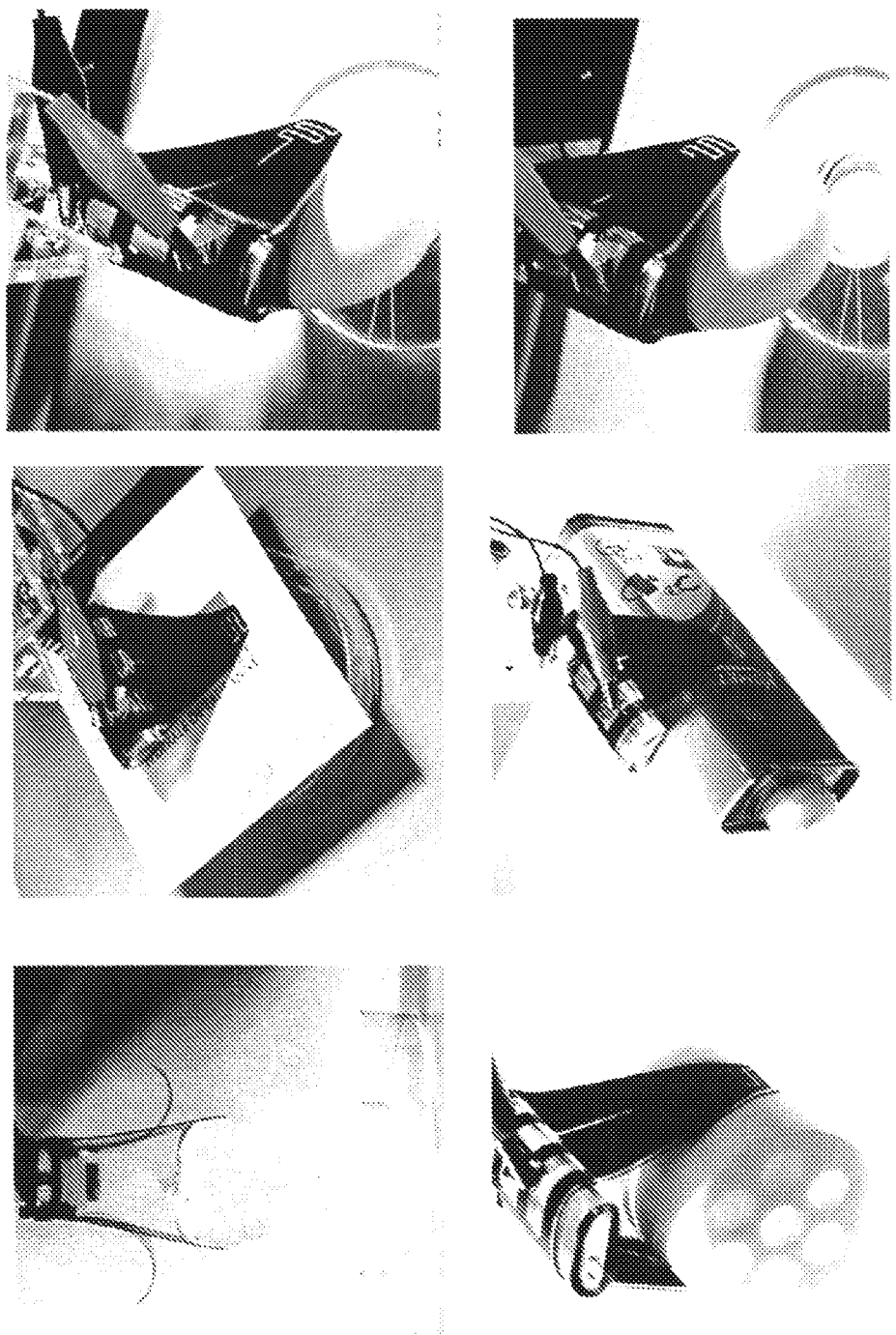
FIG. 14 shows the handling of several conductive and dielectric objects by a soft gripper including a device according to an aspect of the present invention having two active areas on the edges thereof.

The electroadhesion force ensures adaptation of the actuated compliant gripper fingers, and realizes unprecedented functionality and performance in the device. The large holding force provided by the shear electroadhesion force (on the order of Newtons) and the low mechanical grasping force provided by the actuation (on the order of milli-Newtons) allow for easy handling of fragile objects. The normal electroadhesion force allows for picking up flat objects such as a paper without grasping. The functionality of the gripper is most highlighted when the object is deformable. The low mechanical grasping force minimizes the object's deformation, the normal adhesion force keeps the gripper's fingers in conformal contact with the target as it deforms, and the shear adhesion force provides the holding force. The deformable object, a water-filled silicone membrane balloon, is not only highly deformable but also very fragile (membrane thickness of 25 μm), and it would easily break when picked up by the human hand. These challenging features make grasping extremely difficult, and handling of such highly sensitive objects with a gripper has not been reported. Picking up of slippery objects (Teflon tube), can be difficult for other grasping devices and the gecko-inspired adhesion technology. Handling of a metallic oil can has shown that the electroadhesion is suited for conductive objects as well as dielectric objects, as shown in FIG. 14.

The fact that handling of such a wide range of challenging objects is achieved by a single device with simple control input, is unexpected and surprising in light of existing gripping technologies. The novel DEA design shows advantage for grasping application over traditional DEA design as it can produce up to ten times higher electroadhesion forces at the cost of only ≈20% reduction in actuation performance. The total electroadhesion force generated by the bilayer offset interdigitated electrodes can be much higher, in the order of several times, by optimizing the electrode geometry such as the gap and the segmented electrode width, and the thickness of the passive layer, for example in electroadhesion devices with single surface electrodes. The sensing capability of the device makes it an active smart skin enabling shape recognition to understand the object geometry when such information cannot be provided. The interdigitated electrodes can also be used to measure dielectric properties of the object and thus gain insight into its composition.

The soft gripper exemplarily described herein has features that make it suitable for many applications. For instance, the lightweight feature encourages using the device in small transportation drones, and the use of e.g. biocompatible materials allows grasping tasks in food and medical industry. The simplicity of the gripper structure has a high design flexibility able to adapt this method to produce a wide range of grippers of different size and shape, for example, with a plurality of fingers. The interdigitated electrode geometry helps the scaling by homogeneous distribution of adhesion forces, as shown in FIG. 10, and also allows locally tailoring the electrode geometry parts responsible for the adhesion and the actuation at different desired locations.

As a multifunctional polymer actuator, the DEA technology described here could enable other soft robots beyond grippers. The actuation and the controllable high friction force (i.e., electroadhesion force) on the ground surface yield kinematically more efficient locomotion in bioinspired caterpillar robots and gait robots, and enable for example their wall-climbing functionality. Soft modular robots are another promising application where the adhesion works as their interconnection, and the actuation moves the connected structure, or localizes each robot. Finally, all the applications mentioned above can benefit from the simple, highly integrated device and system according to the aspects of the present invention, based on the multi-functionality of the DEA design, providing for (i) electroadhesion and (ii) actuation with different output characteristics, and (iii) sensing with no need of additional sensors.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A device for both converting between electrical energy and mechanical energy and for providing electrostatic adhesion, comprising:
a soft dielectric polymeric support having an upper surface and a bottom surface;
a first set of adjacent electrodes operatively disposed on the upper surface of a first active area of the polymeric support;
a second set of adjacent electrodes operatively disposed on the bottom surface of the first active area of the polymeric support;
a first circuitry configured to provide a first voltage between electrodes that are adjacent to each other within the first set and electrodes that are adjacent to each other within the second set of electrodes, and configured to provide a second voltage between an electrode of the first set and an electrode of the second set that overlap with each other; and
a first deformable insulating layer covering the first set of electrodes and a second deformable insulating layer covering the second set of electrodes,
wherein the first set of electrodes and the second set of electrodes are overlapped along a first axis.

2. The device of claim 1, wherein the polymeric support is arranged in a manner which causes the first active area to deflect in response to a suitable applied voltage.

3. The device of claim 1, wherein the polymeric support is uniaxially and elastically pre-strained on the first active area.

4. The device of claim 1, wherein the electrodes in the first set and the second set are arranged to be parallel to each other.

5. The device of claim 1, wherein the electrodes in the first set and the second set are evenly disposed.

6. The device of claim 1, wherein the electrodes in the first set and the second set are configured to change their shape without substantially compromising a mechanical and electrical performance.

7. The device of claim 1, wherein conversion between electrical and mechanical energy is provided by applying the second voltage with the first circuitry to create opposed charges between the electrode of the first set and the electrode of the second set that overlap with each other, and by applying the first voltage with the first circuitry to create equal charges in the electrodes that are adjacent to each other within the first set and the electrodes that are adjacent to each other within the second set of electrodes.

8. The device of claim 1, wherein the electrostatic adhesion is provided by applying the first voltage with the first circuitry to create alternating unlike charges in the electrodes that are adjacent to each other within the first set and the electrodes that are adjacent to each other within the second set of electrodes, and by applying the second voltage with the first circuitry to create equal charges between the electrode of the first set and the electrode of the second set that overlap with each other.

9. The device of claim 1, wherein conversion between electrical and mechanical energy is provided concurrently with the electrostatic adhesion by applying the first voltage with the first circuitry to create alternating unlike charges in the electrodes that are adjacent to each other within the first set and the electrodes that are adjacent to each other within the second set of electrodes, and by applying the second voltage with the first circuitry to create opposed charges between the electrode of the first set and the electrode of the second set that overlap with each other.

10. The device of claim 1, further comprising:
a third set of adjacent electrodes operatively disposed on the upper surface of a second active area of the polymeric support; and
a fourth set of adjacent electrodes operatively disposed on the bottom surface of the second active area of the polymeric support,
wherein the third set of electrodes and the fourth set of electrodes in the second active area are overlapped along a second axis.

11. The device of claim 10, further comprising a third deformable insulating layer operatively connected on the third set of electrodes of the second active area and a fourth deformable insulating layer operatively connected below the fourth set of electrodes of the second active area.

12. The device of claim 10, wherein the polymeric support is arranged in a manner which causes the second active area to deflect in response to a suitable applied voltage.

13. The device of claim 10, wherein the polymeric support is uniaxially and elastically pre-strained on the second active area.

14. The device of claim 10, wherein the electrodes in the third set and the fourth set are parallel to each other.

15. The device of claim 10, wherein the electrodes in the third set and the fourth set are evenly disposed.

16. The device of claim 10, wherein the electrodes in the third set and the fourth set are configured to change their shape without substantially compromising a mechanical and electrical performance.

17. The device of claim 10, further comprising:
a second circuitry configured to provide a third voltage between electrodes that are adjacent to each other within the third set and electrodes that are adjacent to each other within the fourth set of electrodes, and configured to provide a fourth voltage between an electrode of the third set and an electrode of the fourth set that overlap with each other.

18. The device of claim 17, wherein conversion between electrical and mechanical energy is provided in the second active area by applying the fourth voltage with the second circuitry to create opposed charges in the electrode of the third set and the electrode of the fourth set that overlap with each other, and by applying the third voltage with the second circuitry to create equal charges in the electrodes that are adjacent to each other within the third set and the electrodes that are adjacent to each other within the fourth set of electrodes.

19. The device of claim 17, wherein the electrostatic adhesion is provided by applying the third voltage with the second circuitry in the second active area to create alternating unlike charges in the electrodes that are adjacent to each other within the third set and the electrodes that are adjacent to each other within the fourth set of electrodes, and by applying the fourth voltage with the second circuitry to create equal charges in the electrode of the third set and the electrode of the fourth set that overlap with each other.

20. The device of claim 17, wherein, in the second active area, conversion between electrical and mechanical energy is provided concurrently with the electrostatic adhesion by applying the third voltage with the second circuitry to create alternating unlike charges in the electrodes that are adjacent to each other within the third set and the electrodes that are adjacent to each other within the fourth set of electrodes, and by applying the fourth voltage with the second circuitry to create opposed charges in the electrode of the third set and the electrode of the fourth set that overlap with each other.

21. The device of claim 10, wherein the first active area and the second active area are disposed on opposite sides of the polymeric support.

22. A shear gripping system comprising:
the device according to claim 10, the device operatively connected to a movable load-bearing structure disposed between the first and the second active areas; and
a second circuitry configured to provide a third voltage between electrodes that are adjacent to each other within the third set and electrodes that are adjacent to each other within the fourth set of electrodes, and configured to provide a fourth voltage between an electrode of the third set and an electrode of the fourth set that overlap with each other,
wherein the first circuitry is configured to apply the first voltage to create alternating unlike charges in the electrodes that are adjacent to each other within the first set and the electrodes that are adjacent to each other within the second set of electrodes, and is configured to concurrently apply the second voltage to create opposed charges between the electrode of the first set and the electrode of the second set that overlap with each other,
wherein the second circuitry is configured to apply the third voltage with the second circuitry to create alternating unlike charges in the electrodes that are adjacent to each other within the third set and the electrodes that are adjacent to each other within the fourth set of electrodes, and by applying the fourth voltage with the second circuitry to create opposed charges in the electrode of the third set and the electrode of the fourth set that overlap with each other,
wherein the first, second, third, and fourth voltages provide electrostatic adhesion with conversion of electrical energy to mechanical energy, thereby causing adhesion to an object situated proximate to the first and second active areas and a shear force to be applied to the adhered object, via the load-bearing structure,
wherein the shear force is sufficient to move the adhered object.

23. The shear gripping system of claim 22, wherein the first and second active areas of the device are configured to adhere to opposite sidewalls of the adhered object.

24. A shear gripping system comprising:
the device according to claim 1, the device operatively connected to a movable load-bearing structure,
wherein the first circuitry is configured to apply the first voltage creating alternating unlike charges in the electrodes that are adjacent to each other within the first set and the electrodes that are adjacent to each other within the second set of electrodes, and is configured to concurrently apply the second voltage to create opposed charges between the electrode of the first set and the electrode of the second set that overlap with each other, the first voltage and the second voltage configured such to provide electrostatic adhesion with conversion of electrical energy to mechanical energy, thereby causing adhesion to an object situated proximate to the first active area and a shear force to the adhered object, via the load-bearing structure, and
wherein the shear force is configured to move the adhered object.

25. The shear gripping system of claim 24, wherein the device is configured to adhere to a sidewall of the object and to move the object in a direction substantially parallel to the sidewall via shear interaction between the first active area of the device and the sidewall.

26. The shear gripping system of claim 24, further comprising:
a second device, the second device operatively connected to the movable load-bearing structure.

27. The shear gripping system of claim 26, wherein the first active area of the device and an active area of the second device are configured to adhere to opposite sidewalls of the adhered object.

28. A method for shear gripping an object with a gripping device, the gripping device including an electroactive support having an upper surface and a lower surface, a first set of adjacent electrodes arranged on the upper surface of an active area of the electroactive support, and a second set of adjacent electrodes arranged on the lower surface of the active area of the electroactive support, each electrode of the first set of electrodes overlapping with a corresponding electrode of the second set of electrodes, the method comprising the steps of:

mechanically deflecting the active area of the electroactive support by applying a first voltage to at least one of the first set and the second set of electrodes; and providing electrostatic adhesion to the object with the active area of the electroactive support by applying a second voltage to at least one of the first set and the second set of electrodes, the second voltage being different from the first voltage, wherein the step of mechanically deflecting and the step of providing are performed simultaneously.

29. The method of claim 28, wherein the first voltage creates alternating charges of different polarity between the adjacent electrodes of the first set and between the adjacent electrodes of the second set, and the second voltage creates charges of different polarity between an electrode of the first set that overlaps with an electrode of the second set.

30. The method of claim 28, further comprising a step of: measuring a capacitance change between an electrode of the first set that overlaps with an electrode of the second set.

\* \* \* \* \*